United States Patent
Benkley, III et al.

(10) Patent No.: US 10,095,906 B2
(45) Date of Patent: Oct. 9, 2018

(54) SENSOR EMPLOYING OVERLAPPING GRID LINES AND CONDUCTIVE PROBES FOR EXTENDING A SENSING SURFACE FROM THE GRID LINES

(71) Applicant: IDEX ASA, Fornebu (NO)

(72) Inventors: Fred G. Benkley, III, Andover, MA (US); Ralph W. Bernstein, Hosle (NO); Nicolai W. Christie, Hosle (NO); Geir Ivar Bredholt, Oslo (NO); Øyvind Sløgedal, Hosle (NO)

(73) Assignee: IDEX ASA, Fornebu (NO)

( * ) Notice: Subject to any disclaimer, the term of this patent is extended or adjusted under 35 U.S.C. 154(b) by 766 days.

(21) Appl. No.: 14/626,653

(22) Filed: Feb. 19, 2015

(65) Prior Publication Data

US 2015/0242672 A1  Aug. 27, 2015

Related U.S. Application Data

(60) Provisional application No. 61/943,733, filed on Feb. 24, 2014, provisional application No. 61/942,892, filed on Feb. 21, 2014.

(51) Int. Cl.
*G06K 9/00* (2006.01)

(52) U.S. Cl.
CPC ......... *G06K 9/0002* (2013.01); *G06K 9/0008* (2013.01)

(58) Field of Classification Search
None
See application file for complete search history.

(56) References Cited

U.S. PATENT DOCUMENTS

| 4,016,490 A | 4/1977 | Weckenmann et al. |
| 4,290,052 A | 9/1981 | Eichelberger et al. |

(Continued)

FOREIGN PATENT DOCUMENTS

| AU | 2013100571 A4 | 4/2013 |
| EP | 0902387 A2 | 3/1999 |

(Continued)

OTHER PUBLICATIONS

International Search Report and Written Opinion issued in International Patent Application No. PCT/US2015/016576, 11 pages (dated Jun. 12, 2015.

(Continued)

*Primary Examiner* — Iman K Kholdebarin
(74) *Attorney, Agent, or Firm* — Rothwell, Figg, Ernst & Manbeck, P.C.

(57) ABSTRACT

An electronic sensor forms a grid to detect surface features of a proximally located object, such as a fingerprint. The grid includes a plurality of parallel drive lines connectable to a drive source and a plurality of parallel pickup lines oriented substantially perpendicular to the drive lines and overlapping the drive lines. The drive lines are separated from the pickup lines by an insulating dielectric layer. The overlaps where the drive lines and pickup lines cross define impedance-sensitive electrode pairs which act as pixels at which surface features of the proximally located object are detected. One or more conductive probes extend from one or more corresponding impedance-sensitive electrode pairs, through an overlay layer of insulating material, to the sensing surface.

32 Claims, 20 Drawing Sheets

(56) References Cited

U.S. PATENT DOCUMENTS

| | | | |
|---|---|---|---|
| 4,353,056 A | 10/1982 | Tsikos | |
| 5,325,442 A | 6/1994 | Knapp | |
| 5,371,404 A | 12/1994 | Juskey et al. | |
| 5,399,898 A | 3/1995 | Rostoker | |
| 5,509,083 A | 4/1996 | Abtahi et al. | |
| 5,844,287 A | 12/1998 | Hassan et al. | |
| 5,861,875 A | 1/1999 | Gerpheide | |
| 5,862,248 A | 1/1999 | Salatino et al. | |
| 5,953,441 A | 9/1999 | Setlak | |
| 5,963,679 A | 10/1999 | Setlak | |
| 6,016,355 A | 1/2000 | Dickenson et al. | |
| 6,020,749 A | 2/2000 | Morris et al. | |
| 6,025,726 A | 2/2000 | Gershenfeld et al. | |
| 6,026,564 A | 2/2000 | Wang et al. | |
| 6,069,970 A | 5/2000 | Salatino et al. | |
| 6,289,114 B1 | 9/2001 | Mainguet | |
| 6,327,376 B1 | 12/2001 | Harkin | |
| 6,459,424 B1 | 10/2002 | Resman | |
| 6,483,931 B2 | 11/2002 | Kalnitsky et al. | |
| 6,512,381 B2 | 1/2003 | Kramer | |
| 6,522,773 B1 | 2/2003 | Houdeau | |
| 6,525,547 B2 | 2/2003 | Hayes | |
| 6,636,053 B1 | 10/2003 | Gozzini | |
| 6,714,666 B1 | 3/2004 | Morimura et al. | |
| 6,737,329 B2 | 5/2004 | Lepert et al. | |
| 6,765,274 B2 | 7/2004 | Honda | |
| 6,785,407 B1 | 8/2004 | Tschudi et al. | |
| 6,862,942 B2 | 3/2005 | Kawahata | |
| 6,927,581 B2 | 8/2005 | Gozzini | |
| 6,987,871 B2 | 1/2006 | Kalnitsky et al. | |
| 7,053,633 B2 | 5/2006 | Hara | |
| 7,081,765 B2 | 7/2006 | Miyasaka et al. | |
| 7,084,642 B2 | 8/2006 | Gozzini | |
| 7,088,114 B2 | 8/2006 | Gozzini | |
| 7,251,351 B2 | 7/2007 | Mathiassen et al. | |
| 7,298,875 B2 | 11/2007 | Kim et al. | |
| 7,339,381 B2 | 3/2008 | Van Berkel | |
| 7,522,753 B2 | 4/2009 | Kalnitsky et al. | |
| 7,705,613 B2 | 4/2010 | Misra et al. | |
| 7,738,681 B1 | 6/2010 | Rannow et al. | |
| 7,848,550 B2 | 12/2010 | Mathiassen et al. | |
| 7,940,249 B2 | 5/2011 | Perreault | |
| 8,358,815 B2 | 1/2013 | Benkley et al. | |
| 8,421,890 B2 | 4/2013 | Benkley, III | |
| 8,445,122 B2 * | 5/2013 | Deguet | B82Y 10/00 257/E21.002 |
| 8,564,314 B2 | 10/2013 | Shaikh et al. | |
| 8,860,683 B2 | 10/2014 | Baumbach | |
| 9,135,495 B1 | 9/2015 | Pope et al. | |
| 9,153,490 B2 | 10/2015 | Mitsuhashi et al. | |
| 9,177,191 B2 | 11/2015 | Benkley | |
| 9,798,917 B2 * | 10/2017 | Benkley, III | G06K 9/00026 |
| 9,818,014 B2 * | 11/2017 | Bredholt | G06K 9/00053 |
| 2003/0161511 A1 | 8/2003 | Vermesan et al. | |
| 2005/0101054 A1 | 5/2005 | Mastromatteo et al. | |
| 2005/0156906 A1 | 7/2005 | Chiu et al. | |
| 2006/0056663 A1 | 3/2006 | Call | |
| 2006/0097991 A1 | 5/2006 | Hotelling et al. | |
| 2006/0119369 A1 | 6/2006 | Kawahata et al. | |
| 2008/0002867 A1 | 1/2008 | Mathiassen et al. | |
| 2010/0176271 A1 | 7/2010 | Rim et al. | |
| 2011/0019373 A1 | 1/2011 | Ryhänen et al. | |
| 2011/0102569 A1 | 5/2011 | Erhart | |
| 2011/0182488 A1 | 7/2011 | Bredholt et al. | |
| 2011/0192657 A1 | 8/2011 | Chen et al. | |
| 2011/0267298 A1 | 11/2011 | Erhart et al. | |
| 2012/0090757 A1 | 4/2012 | Buchan et al. | |
| 2012/0134549 A1 * | 5/2012 | Benkley, III | G01N 27/04 382/124 |
| 2012/0162099 A1 * | 6/2012 | Yoo | G06F 3/0412 345/173 |
| 2012/0242635 A1 | 9/2012 | Erhart et al. | |
| 2012/0267740 A1 | 10/2012 | Okamoto | |
| 2013/0181949 A1 | 7/2013 | Setlak | |
| 2013/0194071 A1 | 8/2013 | Sløgedal et al. | |
| 2013/0279769 A1 | 10/2013 | Benkley, III et al. | |
| 2014/0212009 A1 * | 7/2014 | Benkley, III | G06K 9/00013 382/124 |
| 2014/0241595 A1 | 8/2014 | Bernstein et al. | |
| 2014/0361395 A1 | 12/2014 | Bhagavat et al. | |
| 2015/0036065 A1 | 2/2015 | Yousefpor et al. | |
| 2015/0084038 A1 * | 3/2015 | Kang | G06K 9/0002 257/43 |

FOREIGN PATENT DOCUMENTS

| | | |
|---|---|---|
| EP | 0919947 A2 | 6/1999 |
| EP | 0988614 B1 | 9/2004 |
| EP | 1328919 B1 | 1/2007 |
| EP | 1 775 674 A1 | 4/2007 |
| EP | 1303828 B1 | 1/2008 |
| JP | 63-310087 A | 12/1988 |
| JP | 04104377 A | 4/1992 |
| JP | 6-288852 A | 10/1994 |
| JP | 8-235361 A | 9/1996 |
| JP | 10-91769 A | 4/1998 |
| JP | 11-19070 A | 1/1999 |
| JP | 11-164824 A | 6/1999 |
| JP | 11-318864 A | 11/1999 |
| JP | 2001-141411 A | 5/2001 |
| JP | 2001-208509 A | 8/2001 |
| JP | 2001339057 A | 12/2001 |
| JP | 2002-502520 A | 1/2002 |
| JP | 2005156291 A | 6/2005 |
| JP | 2012083829 A | 4/2012 |
| KR | 20080035133 A | 4/2008 |
| TW | 201229852 A1 | 7/2012 |
| TW | 201346779 A | 11/2013 |
| WO | 94/25938 A1 | 11/1994 |
| WO | 9852157 A1 | 11/1998 |
| WO | 9858342 A1 | 12/1998 |
| WO | WO 1998058342 | 12/1998 |
| WO | WO 0199035 A2 | 12/2001 |
| WO | WO 0199035 A3 | 12/2001 |
| WO | WO 2001099036 A3 | 12/2001 |
| WO | WO 2003049012 A2 | 6/2003 |
| WO | 2004098083 A1 | 11/2004 |
| WO | WO 2011080262 A1 | 7/2011 |
| WO | WO 2013058464 A1 * | 4/2013 ........... G06K 9/0002 |
| WO | 2014128249 A1 | 8/2014 |
| WO | WO 2014128249 A1 | 8/2014 |
| WO | WO 2014128260 A1 | 8/2014 |

OTHER PUBLICATIONS

International Preliminary Report on Patentability dated Aug. 23, 2016, issued in related Application No. PCT/US2015/016576, 7 pages.
Third Part Submission as filed in U.S. Appl. No. 14/294,903, 15 pages (Jun. 10, 2015).
Third Part Submission as filed in U.S. Appl. No. 14/294,903, 19 pages (Jun. 10, 2015).
Third Party Submission filed in U.S. Appl. No. 14/451,076, 22 pages (Jul. 31, 2015).
Ratha, N., Bolle, R., "Automatic Fingerprint Recognition Systems," Springer-Verlag New York, Inc., ISBN 0-387-95593-3, New York, NY, 31 pages (2004).
International Search Report issued in International Patent Application No. PCT/EP2014/053427, 4 pages (dated Jun. 23, 2014).
International Search Report issued in International Patent Application No. PCT/EP20014/053403, 3 pages (dated Jun. 25, 2014).
Search Report issued in Norwegian Patent Application No. 20130289, 2 pages (dated Sep. 19, 2013).
Non-Final Office Action issued in U.S. Appl. No. 14/183,893, 33 pages (dated Jan. 13, 2016).
Japanese Notice of Reasons for Rejection with English Translation of Japanese Application No. 2002-503803, 17 Pages (dated Jul. 15, 2010).
International Search Report for PCT/NO01/00238, 4 pages (dated Jan. 9, 2002).

(56) References Cited

OTHER PUBLICATIONS

Balde et al., "Overview of Multichip Technology," Electronic Materials Handbook, ASM International, vol. 1, pp. 144-145, 297-305, 320-321, 438-442 (ISNBN 0-87170-285-1) (no date provided).

Baumgartner et al., "Advanced Multichip Module Technologies," Proceedings of the 9th European Hybrid Microelectronics Conference, ISHM, International Society for Hybrid Microelectronic, pp. 200-207 (Jun. 1993).

Drueke, "A Sealing Process for Printed-Through-Holes," Proceedings of the 9th European Hybrid Microelectronics Conference, ISHM, International Society for Hybrid Microelectronics, pp. 115-122 (Jun. 1993).

\* cited by examiner

SENSOR EMPLOYING OVERLAPPING GRID LINES AND CONDUCTIVE PROBES FOR EXTENDING A SENSING SURFACE FROM THE GRID LINES

CROSS REFERENCE OF RELATED APPLICATION

This application claims the benefit under 35 U.S.C. § 119(e) of the filing date of U.S. provisional patent application Ser. No. 61/942,892 filed Feb. 21, 2014 and U.S. provisional patent application Ser. No. 61/943,733 filed Feb. 24, 2014, the respective disclosures of which are incorporated herein by reference.

FIELD OF THE DISCLOSURE

This disclosure describes sensors for sensing objects located near or about the sensor, such as fingerprint sensors.

BACKGROUND

In the electronic sensing market, there are a wide variety of sensors for sensing objects at a given location. Such sensors are configured to sense electronic characteristics of an object in order to sense presence of an object near or about the sensor and other features and characteristics of the object being sensed.

Sensors may be configured to passively detect characteristics of an object, by measuring parameters such as temperature, weight, or various emissions such as photonic, magnetic or atomic emissions of an object in close proximity or contact with the sensor. An example of this is a non-contact infrared thermometer that detects the black body radiation spectra emitted from an object, from which its temperature can be computed.

Other sensors work by directly exciting an object with a stimulus such as voltage or current, then using the resultant signal to determine the physical or electrical characteristics of an object. An example of this is a fluid detector consisting of two terminals, one that excites the medium with a voltage source, while the second measures the current flow to determine the presence of a conductive fluid, such as water.

A two dimensional array of impedance data may be created by moving an object over a line sensing array and then performing a line by line reconstruction of a two dimensional image. An example of this is a swiped capacitive fingerprint sensor that measures differences in capacitance between fingerprint ridges and valleys as a finger is dragged across it. Such sensors reconstruct a two dimensional fingerprint image after the fact using individual line information.

A simpler way to obtain a two dimensional image is to create a two dimensional sensing array. Such sensors, however, can be prohibitive in cost due to the large number of sensing points needed in the array. An example of this is a two dimensional capacitive fingerprint sensor. A number of these are currently manufactured but use 150 mm$^2$ or more of silicon area and are therefore cost prohibitive for many applications.

These different types of electronic sensors have been used in various applications, such as biometric sensors for measuring characteristics such as fingerprints, medical applications, or fluid measuring monitors. Typically, sensing elements of the various devices are connected to a processor configured to process object information and to enable interpretations for object features.

There exists a need in the art for a device that can provide accurate and reliable sensors for use in different applications, such as fingerprint sensing and/or authentication.

SUMMARY OF THE DISCLOSURE

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

Aspects of the disclosure are embodied in one or more conductive probes that extend an electronic sensor's sensing surface, from a surface of the sensor's pickup elements toward a surface of an overlay disposed on the pickup element. The sensor may, for example, arrange multiple pickup elements and multiple drive elements in a grid pattern, and place multiple conductive probes at the multiple crossover locations so as to create a grid of sensing locations near or at a surface of the overlay.

Further aspects of the disclosure are embodied in a fingerprint sensor integrated in a device having an overlay made of an insulating material (e.g., glass, poly methyl methacrylate, or polycarbonate) is presented. The fingerprint sensor includes at least one drive line (a narrow, elongated drive element) positioned under the overlay, where the drive line is configured to carry a signal that can be coupled to a proximally located object. The fingerprint sensor further includes at least one pickup line (a narrow, elongated pickup element) positioned under the overlay, where the pickup line is oriented substantially perpendicular to the drive line. The pickup and the drive line may be separated by a dielectric layer (e.g., a flexible polymer substrate such as kapton). The drive line and the pickup line may form an impedance-sensitive electrode pair at the location where the drive line crosses the pickup line (the "crossover location").

The fingerprint sensor further includes at least one conductive probe, such as a column-shaped conductor, that extends substantially through the overlay. The conductive probe may be positioned adjacent to the crossover location such that a first end of the conductive probe is in close proximity to the impedance-sensitive electrode pair. For instance, the first end of the conductive probe may contact at least a portion of the impedance-sensitive electrode pair. A second end of the conductive probe may define a fingerprint sensing location on or near an outer surface (e.g., top surface) of the overlay.

In an embodiment, the overlay may be part of a screen of a touch-enabled device, such that the fingerprint sensor is integrated into the touch-enabled device.

In an embodiment, the conductive probe straddles an edge of the pickup element. For example, the conductive probe could be placed so that half of the conductive probe is directly over the pickup element, while half of the conductive probe is not directly over the pickup element. Other embodiments may involve other ratios between a cross sectional area of the conductive probe that is directly over the pickup element versus a cross sectional area of the conductive probe that is not directly over the pickup element (e.g., 5%/95%, 10%/90%, 95%/5%, or any other ratio).

In an embodiment, the sensor includes a matrix of m×n drive lines and pickup lines. Each drive line may be connected to an activation circuit, either permanently or through a switch. Each pickup element may be connected to a buffer or amplifier, either permanently or through a switch. In some instances, m=n. The sensor in such instances may be referred to as a grid sensor. In some instances, m<<n. The sensor in such instances may be referred to as a swipe or line sensor. The m×n pickup lines form m×n impedance-sensitive electrode pairs. The sensor can be configured to activate multiple impedance-sensitive electrode pairs simultaneously to detect fingerprint features at multiple locations. For example, supplying a drive signal to one drive line can couple the drive signal to multiple pickup lines at multiple crossover locations, thus activating the impedance-sensitive electrode pairs at those locations.

In an embodiment, such as where the sensor is a swipe/line sensor, the activation circuit is adapted to receive input from a touch-enabled display device. The activation circuit can activate one of a set of drive lines based on input from the touch-enabled display device. The input may include the speed and direction of a finger moving over the touch-enabled display device.

In an embodiment, the sensor includes at least one grounded probe that is adjacent to the conductive probe. The grounded probe can shield the conductive probe from noise (e.g., cross talk), and may better focus a signal received at the corresponding pickup element. In some cases, a ground layer is placed between the overlay and the impedance-sensitive electrode pair, and the grounded probe is connected to the ground layer.

In an embodiment, the conductive probe (e.g., a conductive column) may be formed using a fabrication technique such as milling, laser drilling, etching, reactive ion etching (RIE), mechanical drilling, or any other technique.

The drive element and/or pickup element can be located on or underneath the overlay. In one example, the drive element and/or pickup element may be processed directly on the overlay by a technique involving metal sputtering, photolithography, and etching. In one example, the drive element is processed on a separate substrate mounted to an underside of the overlay. In an embodiment, the drive element and/or pickup element is integrally formed in the overlay. For instance, lines are etched in the overlay and filled with conductive material to form the drive element and/or pickup element.

The sensor can be implemented to have any pattern. In an embodiment, it can be formed to approximate a shape of a logo of a device manufacturer (e.g., of a smartphone manufacturer).

Other features and characteristics of the present disclosure, as well as the methods of operation, functions of related elements of structure and the combination of parts will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various, non-limiting embodiments of the present disclosure. In the drawings, common reference numbers indicate identical or functionally similar elements.

DETAILED DESCRIPTION

Figure 1:
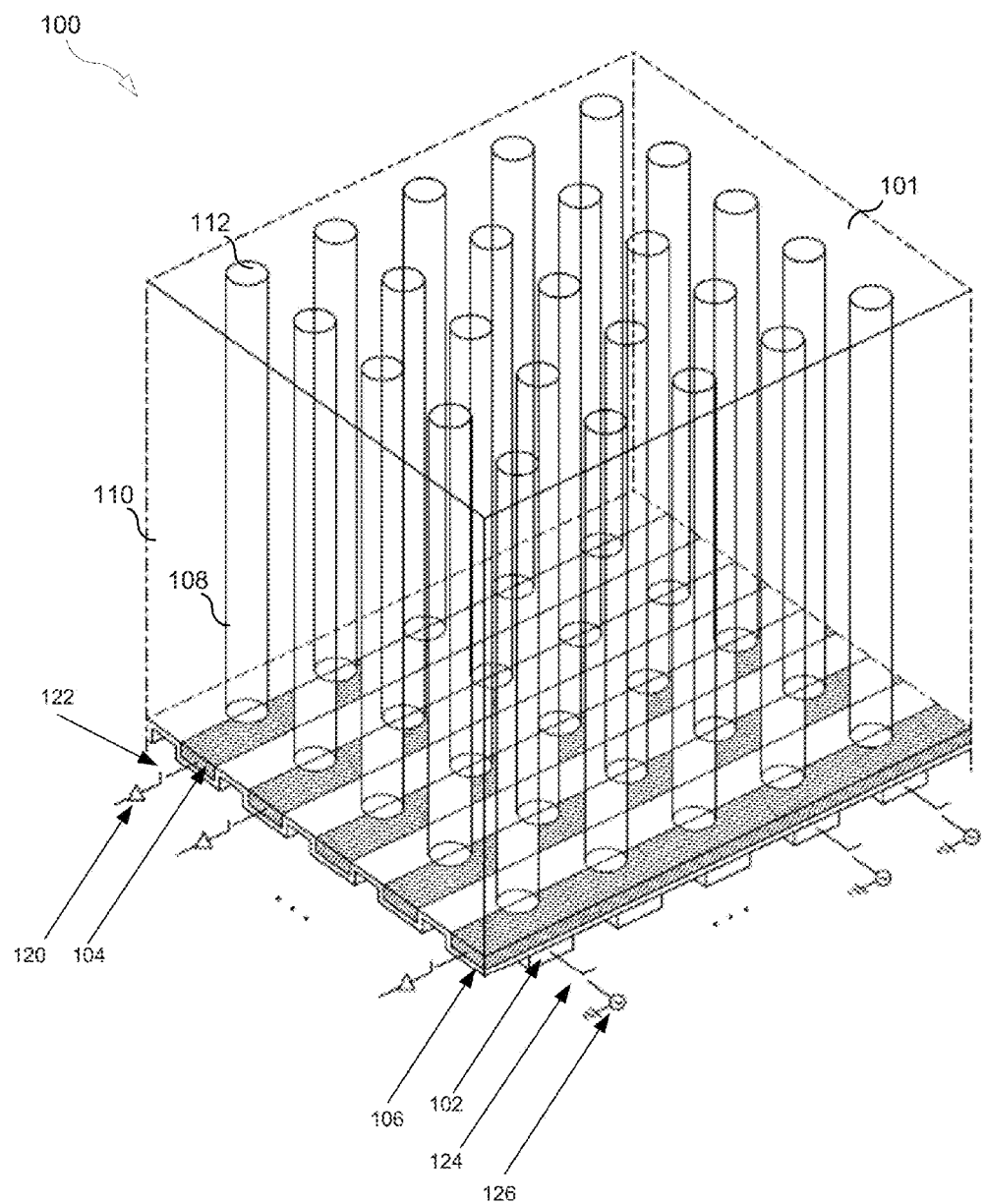
FIG. 1 illustrates a top perspective view of an electronic sensor according to an embodiment of the present disclosure.

The present disclosure relates to an electronic sensor for detecting proximally located objects. In an embodiment, the sensor is a fingerprint sensor that detects surface features (e.g., ridges and valleys) of a finger placed on the electronic sensor. In an embodiment, the electronic sensor operates based on interaction between a pair of electrodes that include a drive element and a pickup element. The pickup element may be capacitively coupled to the drive element, and may sense a signal that passes from the drive element to the pickup element. Features of a proximally located object can be detected based on whether the sensor detects a change in a signal being received at the pickup element. In an embodiment in which the electronic sensor is a fingerprint sensor, the sensor can detect whether a particular location on the sensor surface is directly under a ridge of the fingerprint or is directly under a valley of the fingerprint. Ridges of a fingerprint can provide low-impedance path to a ground potential, while valleys of the fingerprint can provide a high impedance that is similar to situations in which no proximally located object is present at all. Thus, if a fingerprint ridge contacts a pickup element, it may noticeably attenuate a signal being detected at the pickup element. If the pickup element is instead directly under a valley of the fingerprint, the signal being detected at the pickup element may have substantially no attenuation. The electronic sensor in the embodiment can thus distinguish between a fingerprint ridge and a fingerprint valley based on the signal detected at the pickup element.

In an embodiment, the electronic sensor forms a grid to detect surface features of a proximally located object at a plurality of locations. The grid includes a plurality of parallel drive lines, which are each connectable to a drive source, and includes a plurality of parallel pickup lines, are oriented transversely (preferably perpendicular) to the drive lines. The drive lines are separated from the pickup lines by an insulating (e.g., dielectric) layer. Each drive line may thus be capacitively coupled to a pickup line. In the embodiment, the drive lines can form one axis (e.g., X-axis) of the grid, while the pickup lines form another axis (e.g., Y-axis) of the grid. Each location where a drive line and a pickup line cross may form an impedance-sensitive electrode pair. This impedance-sensitive electrode pair may be treated as a pixel (e.g., a X-Y coordinate) at which a surface feature of the proximally located object is detected. The grid forms a plurality of pixels that can collectively create a map of the surface feature of the proximally located object. For instance, the pixels of the grid can map locations where there is a ridge of a fingertip touching the electronic sensor, and locations where there is a valley of the fingerprint. The map can be used as pattern to match with ridge/valley patterns stored in a database. Additional details of a fingerprint sensor with overlapping drive lines and pickup lines are discussed in more detail in U.S. Pat. No. 8,421,890, entitled "Electronic imager using an impedance sensor grid array and method of making," and U.S. Patent Application Publication No. US 2012-0134549, entitled "Biometric sensing", the respective disclosures of which are incorporated by reference in their entirety.

This application recognizes not only the use of overlapping drive lines and pickup lines to form a sensing grid, but also recognizes that repeated contact between a proximally located object and the pickup element can eventually damage the pickup element. Other environmental factors, including humidity, corrosion, chemical or other mechanical wear can also damage the pickup element. Further, radiation, noise, and other environmental factors at the pickup element may interfere with the accuracy of the electronic sensor. Although an insulating film can be placed over the pickup element, the film would need to be thin enough so that it does not interfere with detection of surface features of a proximally located object. A thin insulating film, however, can itself be worn away by environmental factors, and would not prevent the electronic sensor from experiencing reliability problems.

In an embodiment, aspects of the disclosure address the above-described issues by providing one or more conductive probes (e.g., column-shaped conductors) that allow a distance between the pickup element and a sensing surface of the sensor (e.g., an outer surface of the sensor) to be extended. In one orientation, each conductive probe is a vertical column extending above a horizontally-oriented sensor grid. The vertical column may extend from a pickup element of an impedance-sensitive electrode pair to the sensing surface. More generally, each conductive probe may extend from a pixel location, where a drive line intersects a pickup line, toward the sensing surface. The one or more conductive probes can be embedded in an overlay made of an insulating material, which is disposed on top of the pickup elements.

In the embodiment, because the one or more conductive probes extend toward a sensing surface of the electronic sensor that is removed from the sensor grid, they enhance the ability of a pickup element to detect features of an object at the sensing surface. The enhanced detection ability thus allows the insulating overlay to have a greater thickness than with the insulating film mentioned above. The thicker insulating overlay can provide better protection against environmental conditions. In instances where the electronic sensor is used for a touch screen device, the insulating overlay may be a transparent material that is part of the touch screen. Such a configuration provides a way for integrating the electronic sensor in a touch-enabled device.

FIG. 1 illustrates a portion of an example electronic sensor 100 for sensing surface features of an object proximally located to a sensing surface 101 of the sensor 100. The sensor 100 includes a plurality of drive elements 102 and a plurality of pickup elements 104. In one embodiment, drive elements may be formed as elongated, plate-shaped strips of conductive material (e.g., copper, aluminum, gold) that are substantially parallel, which may be referred to as drive lines or drive plates. The pickup elements may be formed as elongated, plate-shaped strips of conductive material that are substantially parallel, which may be referred to as pickup lines or pickup plates. An insulating layer 106 separates the drive lines and the pickup lines. The drive elements 102 and the pickup elements 104 are oriented transversely to each other, and in one embodiment, are perpendicular to each other.

The electronic sensor 100 further includes a plurality of conductive probes 108 (e.g., elongated conductive elements) that extend from a pickup line 104 toward the sensing surface 101. As shown in FIG. 1, a first end (e.g., a lower end in the figure) of the conductive probe 108 is adjacent to a location where a drive line 102 crosses a pickup line 104 (the crossover location). In an embodiment, the first end is in contact with a portion of the impedance-sensitive electrode pair formed at the crossover location. In an embodiment, the first end is in proximity to the impedance-sensitive electrode pair, but does not contact the electrode pair. In the embodiment, the conductive probe is capacitively coupled to the impedance-sensitive electrode pair. In an embodiment the conductive probe extends substantially through an overlay 110 made of an insulating material. As illustrated later in the disclosure, a second end (e.g., an upper end in the figure) of the conductive probe 108 can terminate at a top surface (e.g., be flush with the top surface) of the overlay, above the top surface, or below the top surface. The top surface of the overlay 110 may be the sensing surface 101, as illustrated in FIG. 1, or may be separated from the sensing surface by one or more other layers.

In an embodiment, the insulating material for the overlay 110 is transparent. In an embodiment, the insulating material 110 is selected from a group consisting of glass, poly methyl methacrylate, and polycarbonate. In cases where the insulating material 110 includes glass or a glass substitute (e.g., acrylic glass (poly methyl methacrylate) or polycarbonate), the conductive probes 108 may be formed as vias in the insulating material. In some cases, the overlay 110 may be made of a thick flexible polymer substrate instead of glass. The conductive probes may be embedded within the polymer substrate. For example, an etching technique may form columns in the overlay 110, which may be filled with conductive material (e.g., copper, indium tin oxide, a conductive paste (e.g., made of carbon nanotubes, graphite powder, copper), a conductive adhesive (e.g., silver, copper, graphite), or a conductive polymer) through deposition, sputtering, electroplating, or another technique. In another example, the conductive probes may be formed first, as narrow, elongated elements, and the insulating material for the overlay 110 may then be deposited to embed the conductive probes.

In an embodiment, the conductive probes may be made of a transparent material such as indium tin oxide (ITO) material, which may render the conductive probes imperceptible to a user. In an embodiment, the conductive probes may have a cross section that is sufficiently small to render the conductive probes imperceptible to a user.

The embodiment in FIG. 1 includes a plurality of drive lines 102 and a plurality of pickup lines 104. As discussed above, the drive lines may form one axis (e.g., a X-axis) of a grid (array) while the pickup lines may form another axis (e.g., Y-axis). Each location where a pickup line crosses over a drive line (i.e., a crossover location) may form an impedance-sensitive electrode pair that is used as a pixel in the grid. Also as discussed above, a conductive probe 108 may extend from a crossover location toward the sensing surface 101. In FIG. 1, the conductive probes 108 thus effectively extend the sensing surface from a plane defined by the tops of the pickup lines 104 in a vertical direction to top surface 101. For instance, the conductive probes 108 extend from at or near the pickup lines 104 to a plurality of positions 112 at or near the sensing surface 101. The conductive probes 108 allow their corresponding impedance-sensitive electrode pairs to better detect surface impedance changes at or near the positions 112 and thus to better detect surface features of an object at or near the positions 112. For a touch screen device, the use of the conductive probes allows the drive elements and pickup elements of the sensor 100 to be integrated within its touch screen. This integration saves space on the touch screen device, by allowing the sensor 100 to share its sensing surface with a touch surface of the touch screen device. The use of the conductive probes 108 also enhances the range of permissible thicknesses for the overlay 110.

In an embodiment, the lower end of each conductive probe 108 straddles an edge of a pickup line 104 and thus, the lower end of the probe partially overlaps the insulating layer adjacent the pickup line 104. In the embodiment illustrated in FIG. 1, half the width of a conductive probe 108 is located directly over a corresponding pickup line 104, while half the width of the conductive probe 108 is located over adjacent insulating material. In other embodiments, the conductive probe 108 may have 5% of its width located directly above the pickup line 104, while 95% of the width is located over the adjacent dielectric material, or may have any other ratio for such placement (e.g., 10/90, 90/10, 95/5).

Figure 4:
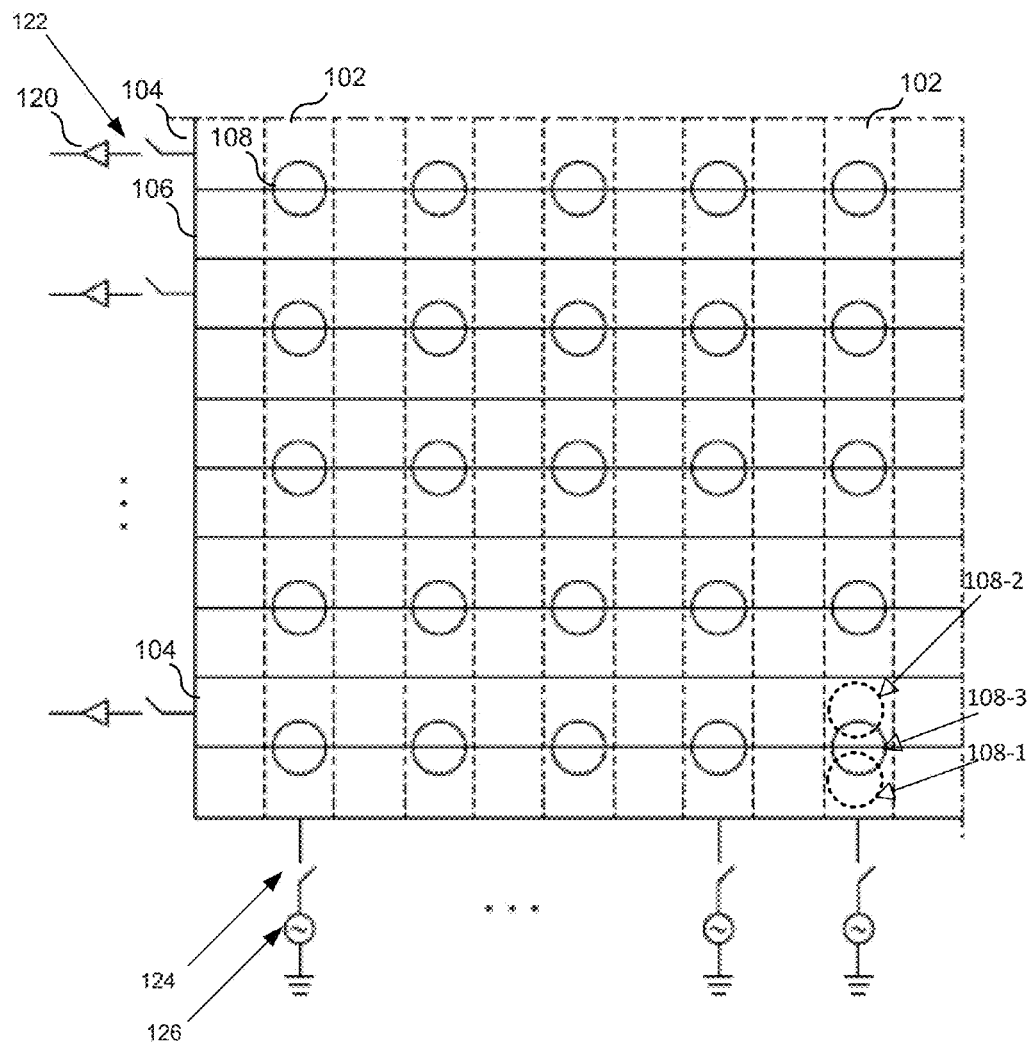
FIG. 4 illustrates a top view of an electronic sensor according to an embodiment of the present disclosure.

As shown in FIGS. 1 and 4, in an embodiment, an activation circuit 126 supplies a signal to a drive line 102. Further, a detecting circuit 120 (e.g., an amplifier or buffer) detects a signal received at the pickup line 104. In the embodiment illustrated in FIG. 1, an activation circuit 126 is provided for each drive line and a detecting circuit 120 is provided for each pickup line. In other embodiments, the sensor 100 may include fewer activation circuits and/or fewer detecting circuits 120. For instance, multiple drive lines may share an activation circuit 126 via a multiplexor, while multiple pickup lines may share a detecting circuit 120 via a multiplexor. In the embodiment of FIG. 1, the sensor 100 includes a switch 124 that can disconnect a drive line 102 from an activation circuit 126 and includes a switch 122 that can disconnect a pickup line 104 from a detecting circuit 120. The switches allow the sensor 100 to activate only one drive line during a time period and to detect signals at various crossover locations along the activated drive line. In some cases, the sensor 100 may simultaneously detect the signals from multiple pickup lines. In some cases, the sensor 100 may detect a signal from one pickup line while connecting one or more adjacent pickup lines to ground. The grounded pickup lines may shield the measured pickup line from noise. The detected signal may indicate a surface feature at a X-Y coordinate corresponding to the activated drive line and the measured pickup line. The sensor 100 may sequentially activate other drive lines to detect surface features at other X-Y coordinates.

The activation circuits 126 and detecting circuits 120 may be located at any location. In some instances, they may be part of the sensor 100. For example, they may be embedded within the overlay 100, where they may be adjacent to the drive lines and pickup lines, or below the drive lines and pickup lines. In some instances, they may be provided as a separate component (e.g., an activation and detection component) made or sold separately from the sensor 100.

Figure 2:
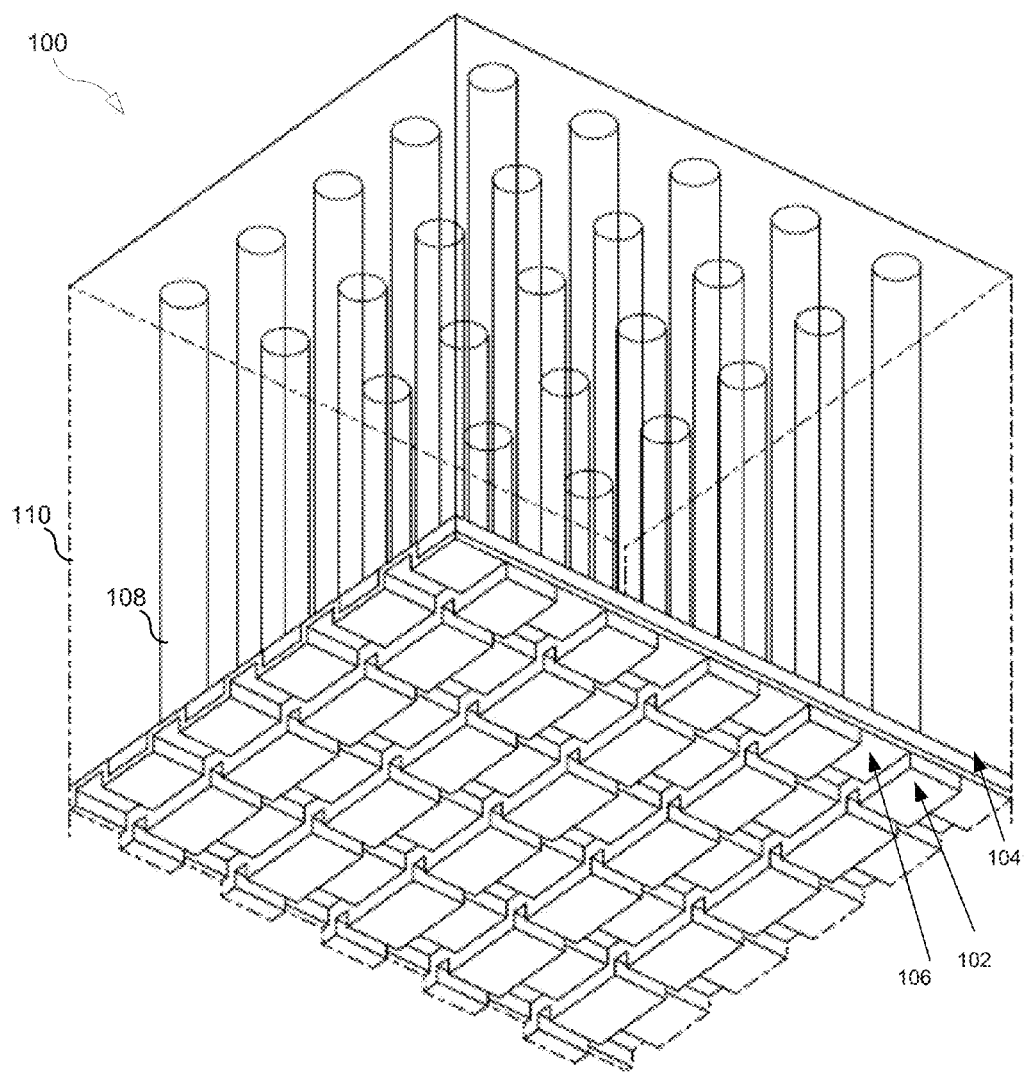
FIG. 2 illustrates a bottom perspective view of an electronic sensor according to an embodiment of the present disclosure.

In an embodiment, the drive lines and pickup lines can be formed with lithography techniques (e.g., deposition or ion-exchange metallization, mask forming, etching). For instance, the drive plates and/or the pickup plates may be formed by depositing a conductive layer, patterning a mask over the conductive layer, and etching the conductive layer into a plurality of parallel lines. The various layers may be formed successively on top of one another using such techniques. Forming the various layers in this manner may lead to the stepped shape of the insulating layer 106 and of the drive plates 102, as illustrated in FIGS. 1 and 2.

More specifically, in one embodiment, the pickup elements 104 are arranged in a substantially parallel configuration, e.g., on a surface of the overlay 110. As shown in FIG. 2, the dielectric layer 106 is then deposited over the pickup elements 104 in such a manner that the dielectric layer covers each pickup element and extends into the gaps between adjacent pickup elements, thereby defining spaced-apart grooves that are parallel to the pickup lines 104 in the lower surface of the dielectric layer 106. The drive elements 102 are then deposited over the dielectric layer 106 in parallel strips in a manner such that portions of each drive line 102 flow into and fill grooves formed in the dielectric layer 106.

Figure 3:
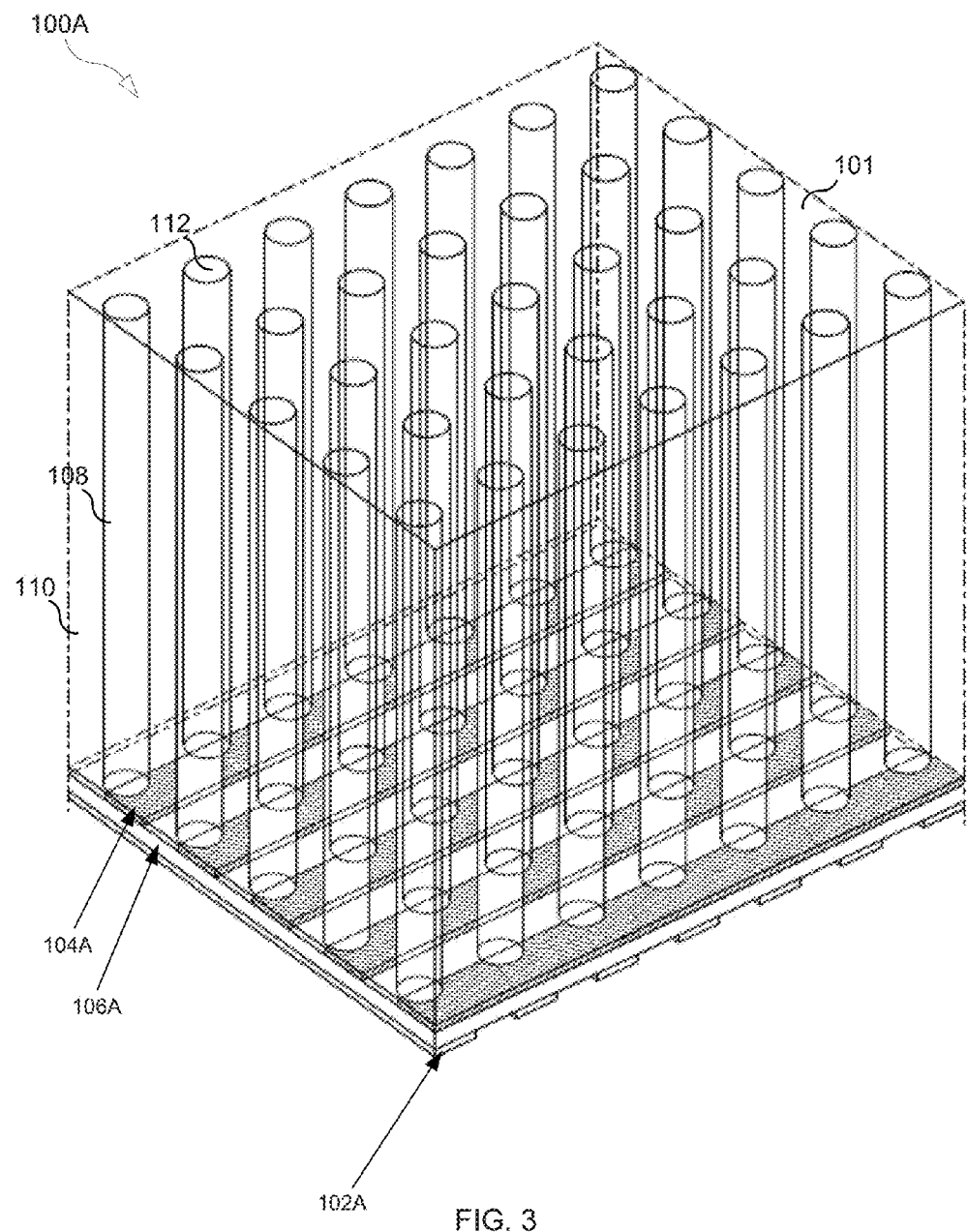
FIG. 3 illustrates a perspective view of an electronic sensor according to an embodiment of the present disclosure.

FIG. 3 illustrates an alternative a sensor 100A in which the drive lines 102A, pickup lines 104A, and insulating layer 106A are planar. In general, the drive lines, insulating layer, pickup lines, and overlay may have any shape.

In an embodiment, the sensor includes other layers. For instance, a conductive layer can be formed below the drive lines and pickup lines. The conductive layer can shield the pickup lines from noise, and can provide a ground potential. In an embodiment, additional probes are formed and electrically connected to the ground potential. The grounded probes may be located adjacent to one or more of the conductive probes 108, and may shield the one or more conductive probes 108 from noise.

In an embodiment, structures (e.g., vias) for the conductive probes may be formed by mechanical drilling, chemical etching, reactive ion etching, laser drilling, and/or other micro-machining processes.

FIG. 4 illustrates a top view of the electronic sensor 100. The figure illustrates each conductive probe 108 straddling a boundary between a pickup line 104 and an adjacent insulating layer 106. The figure further shows that the plurality of conductive probes 108 can be arranged in a grid pattern to substantially correspond with the crossover locations between the drive lines 102 and the pickup lines 104.

Figure 5:
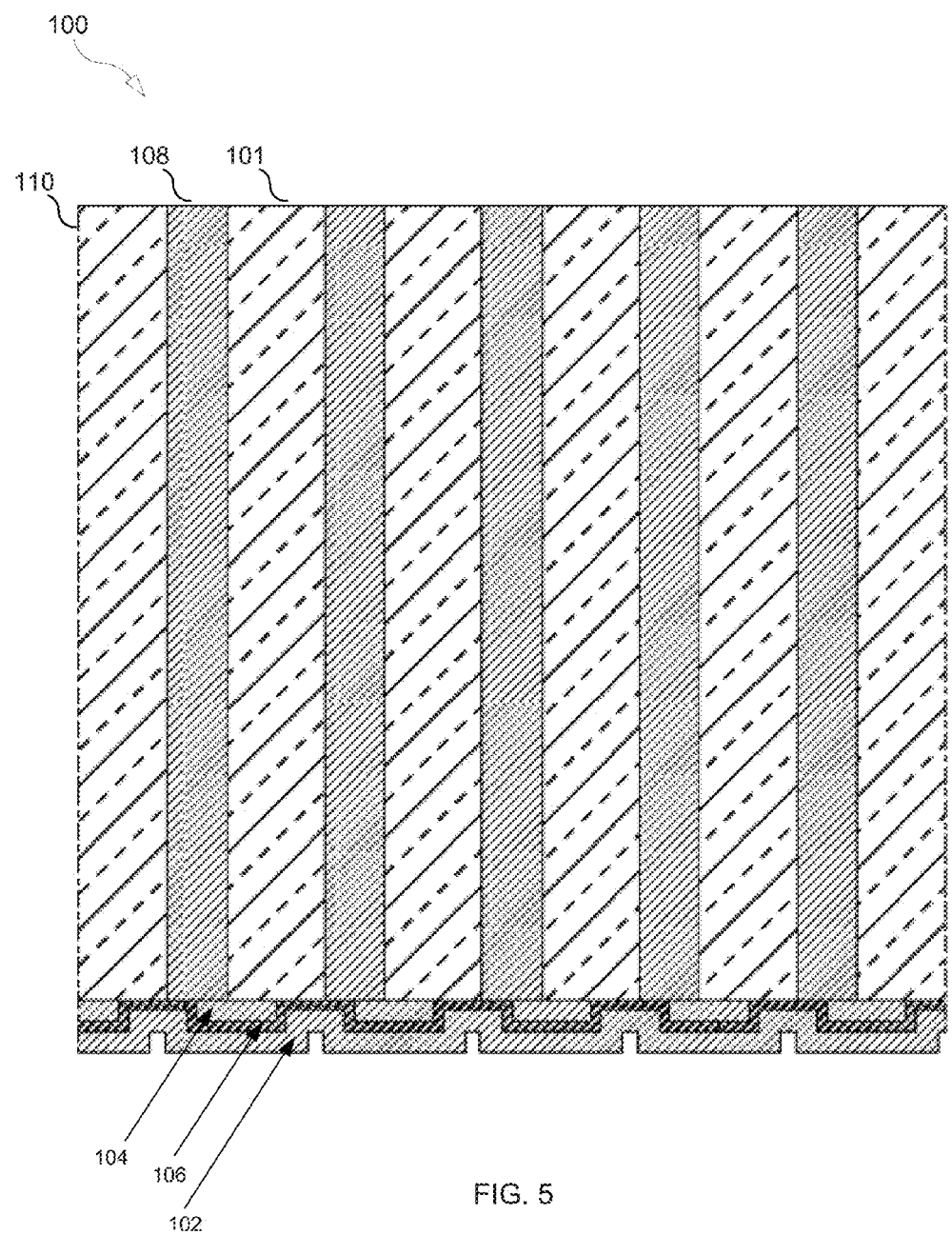
FIGS. 5-11 illustrate side views of an electronic sensor according to embodiments of the present disclosure.

FIG. 5 illustrates a side view of the electronic sensor 100. The illustrated embodiment shows that each conductive probe 108 forms a via through the overlay 110. While the illustrated embodiment shows a conductive probe 108 that is in contact with a pickup plate 104, the conductive probe 108 may be electrically insulated from the pickup plate 104 in other embodiments. Further, while the illustrated embodiment shows a top end of the conductive probe 108 to be flush with the sensing surface 101, in other embodiments the top end may be located beneath the sensing surface, so that the overlay 110 better protects the conductive probe 108 against environmental conditions.

Figure 6:
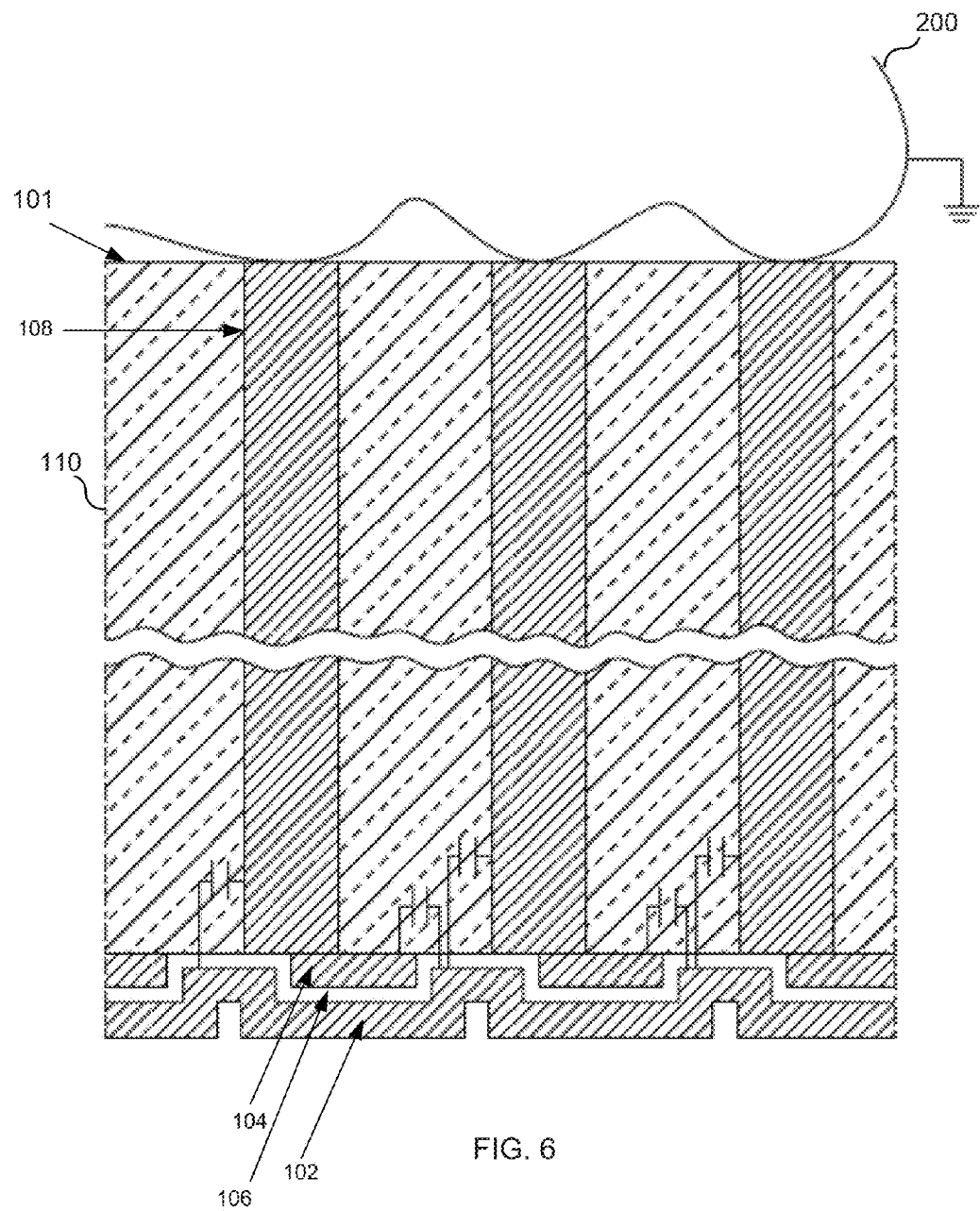

FIG. 6 illustrates a situation in which the top surface of the overlay 110 is a sensing surface 101 that contacts a proximally located object, such as a fingertip 200. Coupling between a drive line 102 and a pickup line 104 in FIG. 6 may be modeled as a capacitance. The capacitance includes a fringe capacitance from a fringe electric field between the two lines, which are illustrated later in the disclosure. Coupling between the drive line 102 and a conductive probe 108 may also be modeled as a capacitance.

Figure 7:
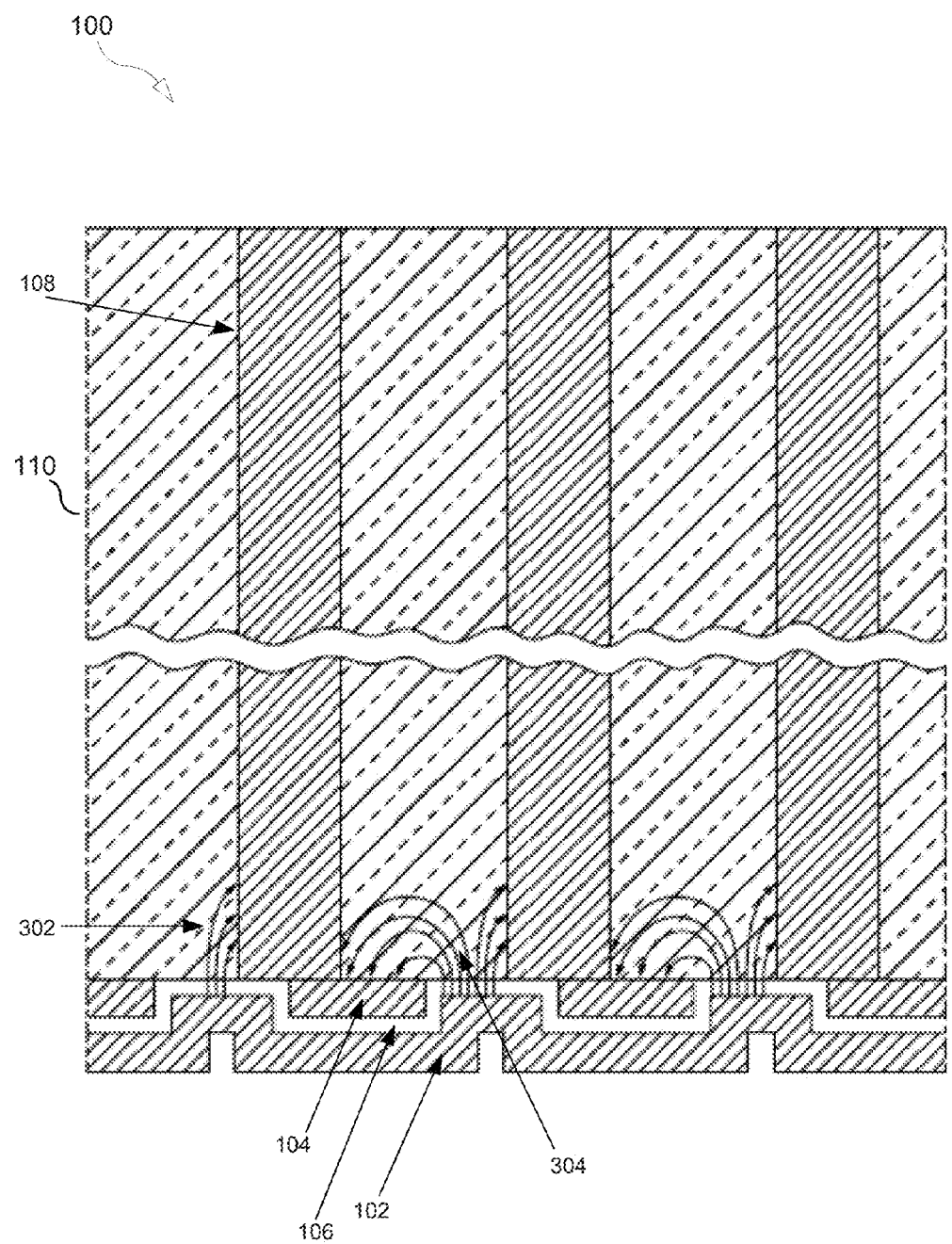

The fringe electric fields are illustrated in FIG. 7, which shows field lines 302 between the drive line 102 and conductive probe 108 and field lines 304 between drive line 102 and pickup line 104 in a situation where no object is in proximity to the electronic sensor 100. FIG. 7 illustrates an advantage of placing the conductive probe 108 to straddle a boundary between a pickup line 104 and its adjacent dielectric layer 106. More specifically, in some instances, the detection performed at the pickup line 104 relies on detecting signals provided by a fringe electric field coupling the pickup line 104 and the drive line 102. A change in the fringe electric field may indicate an object in proximity to the electronic sensor 100. As illustrated in FIG. 7, however, the probe 108 is a conductor that prevents the existence of an electric field inside the conductor. In some examples, each of the conductive probes 108 can be placed in any of a number of positions with respect to the drive and pickup plates, such as a position on top of drive plate 102 and centered over insulating material that is adjacent to a pickup plate 104, a position centered over the pickup plate 104, a position straddling the pickup plate 104 and drive plate 102, or any position in between. Three of the positions are illustrated as positions 108-1, 108-2, and 108-3, respectively, in FIG. 4. FIG. 7 illustrates the straddled configuration, in which the conductive probe 108 is shifted toward one edge (e.g., the left edge) of the pickup element 104. This configuration optimizes the fringe electric field to form near the other edge (e.g., the right edge) of the pickup line 104.

Figure 8:
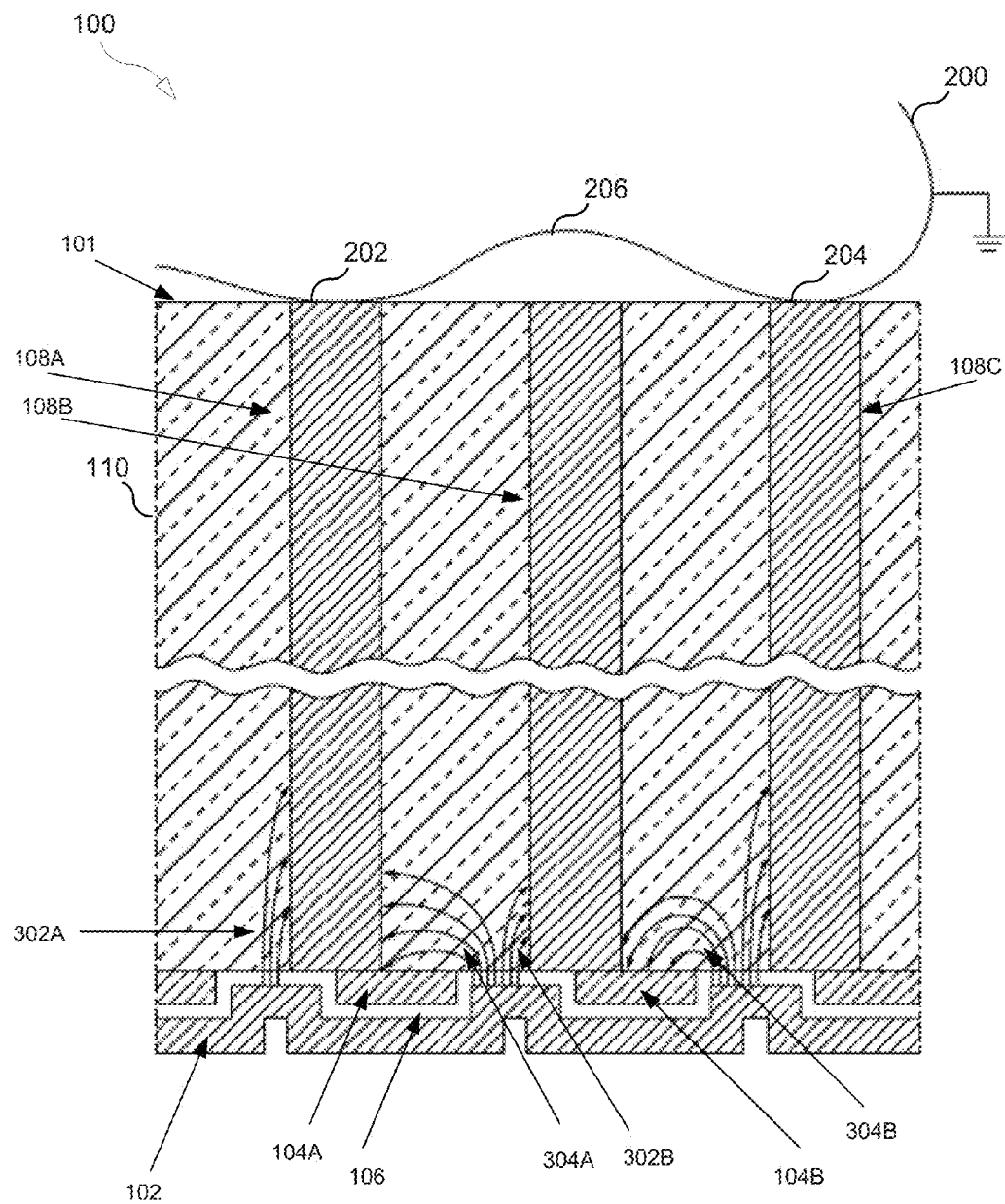

FIG. 8 illustrates a situation in which an object such as a fingertip 200 touches the sensing surface 101 of the sensor 100. The figure shows that ridges 202, 204 of fingertip 200 provide a low-impedance path to ground. More particularly, the ridges 202, 204 of the fingertip 200 may be in physical contact with conductive probes 108A and 108C, such that the ridges 202, 204 provide an AC path to ground. Grounding conductive probe 108A, for example, can ground pickup line 104A, thus attenuating the signal received at the pickup line 104A. Stated differently, the fringe electric field 304A between drive line 102 and pickup line 104A and the fringe electric field 302A between drive line 102 and conductive probe 108A may be altered when the corresponding conductive probe 108A contacts the ridge 202. The alteration can weaken the strength of the fringe electric field at the pickup line 104A, which can attenuate the signal detected at pickup line 104A. Thus, for fingerprint sensing, the attenuated signal at the crossover location between pickup line 104A and drive line 102 may be interpreted as a fingerprint ridge at the crossover location or the probe's location.

FIG. 8 further shows that when a valley 206 of the fingertip 200 is located over a conductive probe 108B, the fringe electric field 304B between drive line 102 and pickup line 104B and the fringe electric field 302B between drive line 102 and conductive probe 108B around the underlying impedance-sensitive electrode pair are substantially less affected. More specifically, the figure illustrates a valley 206 located over conductive probe 108B. The valley 206 provides a gap that electrically reduces the conductive probe 108B impedance to the fingertip 200 compared to fingertip 200 in contact with conductive probe 108A at ridge 202, thereby reducing the amount of signal attenuation at pickup line 104B as compared to at pickup line 104A.

Figure 9:
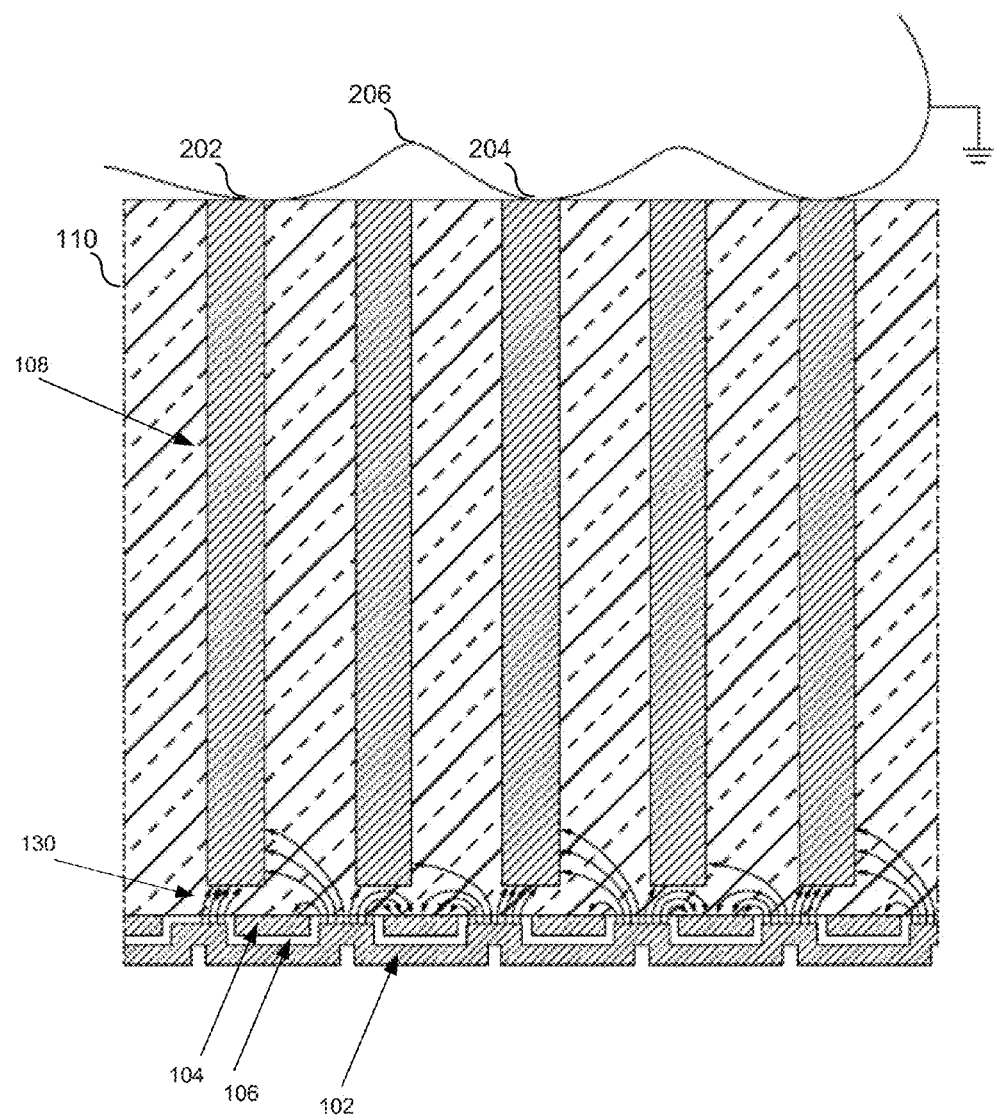

FIG. 9 illustrates an embodiment in which a dielectric region 130 separates the conductive probes 108 and the pickup lines 104 either on the top, bottom or both ends of sensor body 101. The gap may be modeled as a capacitance coupling a conductive probe 108 to a pickup line 104. The capacitive coupling may provide an AC ground for a pickup line 104 when a ridge of a fingertip 200 is in contact with pickup line 104's corresponding conductive probe 108.

Like in FIG. 8, FIG. 9 also shows that grounding the conductive probe 108 can alter the fringe electric field around a pickup line 104. The altered fringe electric field may result in an attenuated signal detected at a crossover location between a drive line 102 and a pickup line 104. The attenuation may be interpreted as an object in contact with the crossover location or the probe's location.

Figure 10:
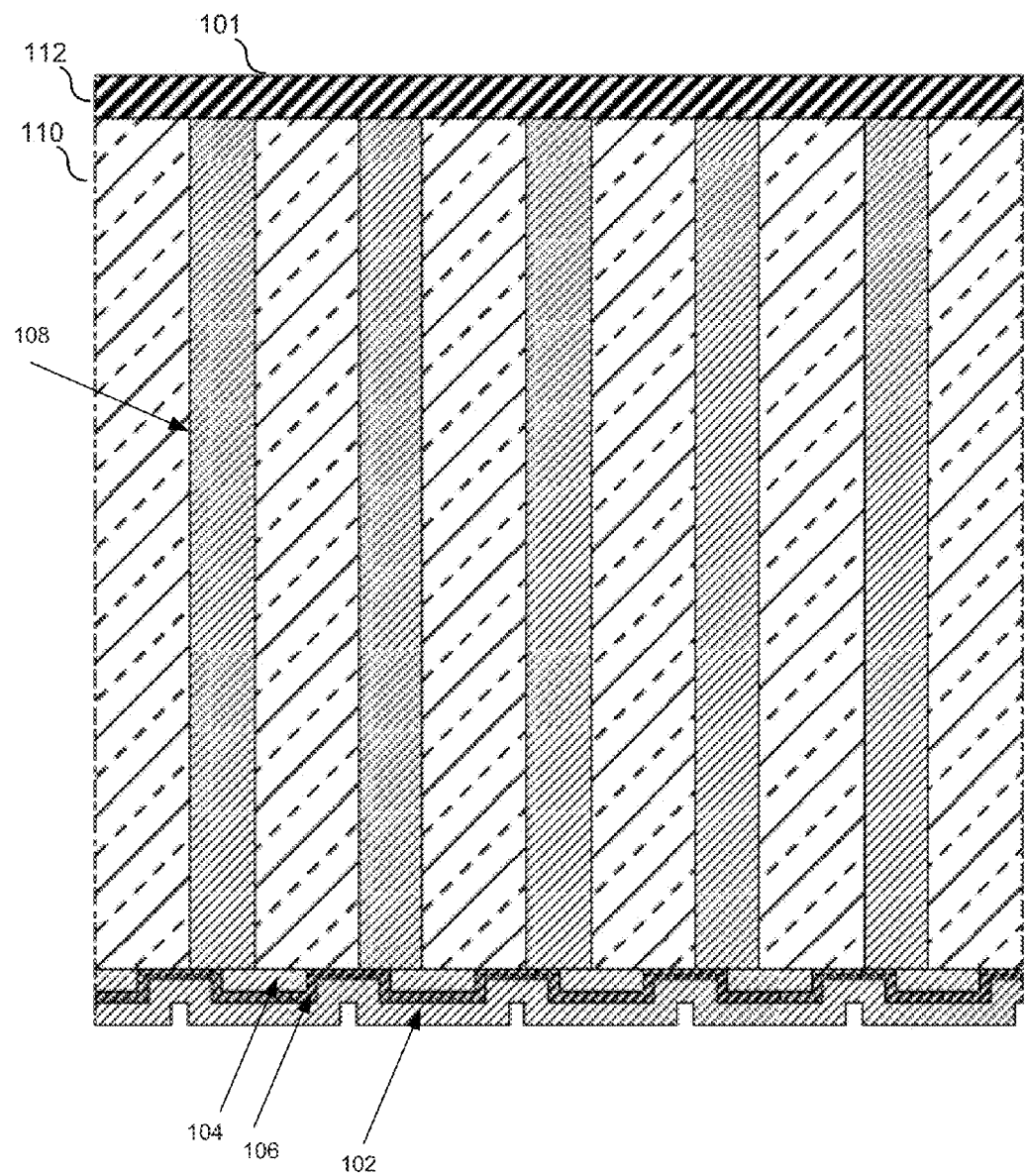

FIG. 10 illustrates an embodiment in which an insulating layer 112 is located above the conductive probes 108 on the top surface of the overlay 110. In some instances, the insulating layer 112 includes a different material than the insulating material of overlay 110. In some instances, the insulating layer 112 may include the same materials as that making up the overlay 110. In such instances, the insulating layer 112 may be considered a different layer than the overlay 110 in that it may be deposited or otherwise formed after the overlay 110 is formed. In certain cases, the insulating layer 112 may be transparent.

In FIG. 10, the sensing surface 101 is located at a top surface of the insulating layer 112 rather than a top surface of the overlay 110. The insulating layer 112 may provide capacitive coupling between the conductive probes 108 and an object touching the sensing surface 101, such as a ridge of a fingertip. The permittivity $\varepsilon$ and thickness $d$ of the insulating layer 112 may be selected to provide a low impedance path from the conductive probes 108 to AC ground when an object such as the ridge of the fingertip touches the sensing surface 101.

Figure 11:
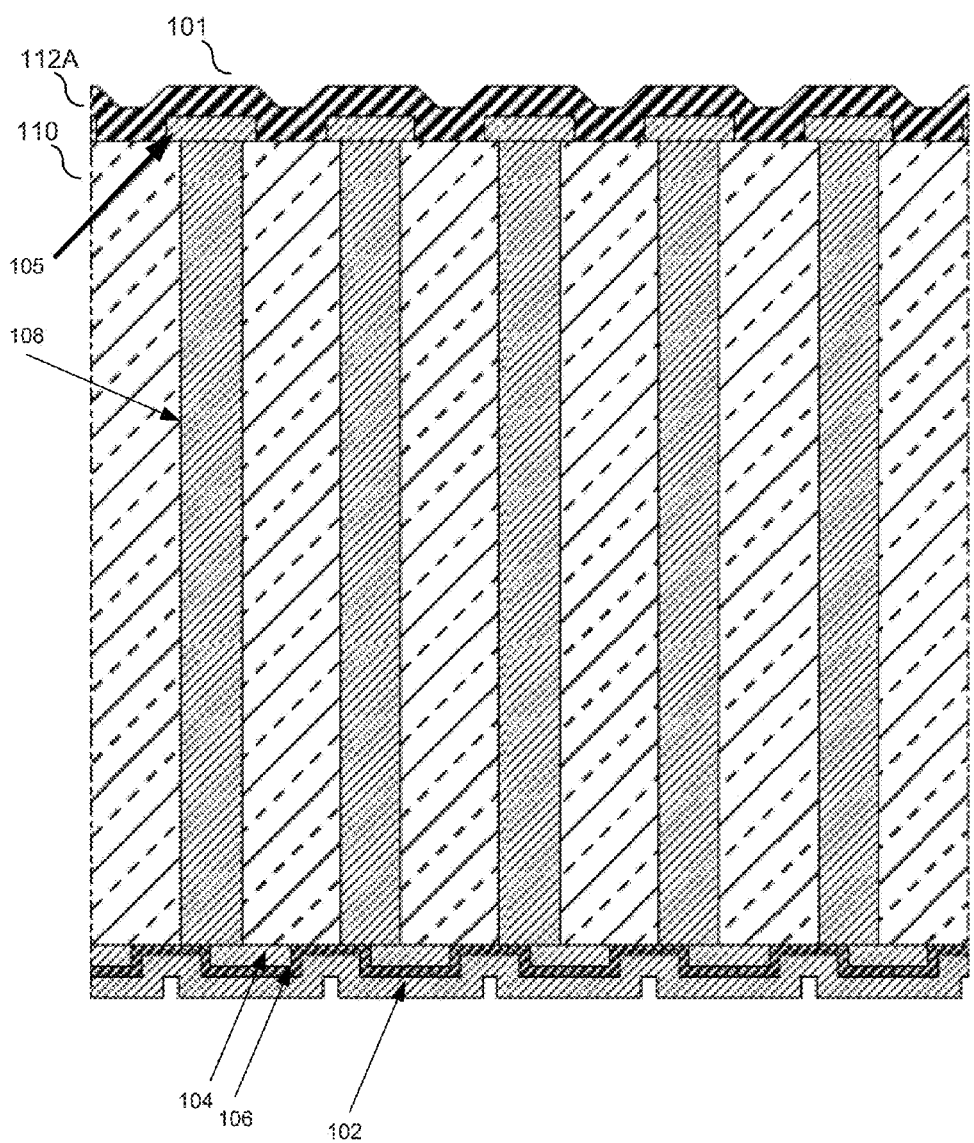

FIG. 11 illustrates an embodiment that also includes an insulating layer 112A placed over the conductive probes 108. The illustrated embodiment illustrates electrodes 105 placed on a top surface of the overlay 110. In some cases, such electrodes may expand a surface area of a conductive probe at the top surface of the overlay 110. The increased surface area may increase capacitive coupling between an object touching the sensing surface 101 and the conductive probe 108. In some instances, the electrodes 105 are galvanically connected to the conductive probes 108. In some instances, the electrodes 105 are electrically insulated from the conductive probes 108, but the insulation between the electrodes 105 and the conductive probes 108 may still provide capacitive coupling between them.

In an embodiment, the sensor includes at least one grounded probe that is adjacent to a conductive probe. The grounded probe can shield the conductive probe from noise (e.g., cross talk), and may better focus a signal received at the corresponding pickup element. In some cases, a ground layer is placed between the overlay and the impedance-sensitive electrode pair, and the grounded probe is connected to the ground layer. For example, referring back to FIG. 1, the sensor 100 may include a second plurality of conductive probes. Probes in the second plurality of second probes can have the same dimensions as the conductive probes 108, or may have different dimensions (e.g., may be thicker, or thinner, and may be shorter or longer). Each of the second plurality of second probes can be placed between the conductive probes 108. In one instance, each of the second plurality of probes can be disposed along an imaginary line connecting two conductive probes 108. In one instance, the second plurality of probes may be arranged such that the conductive probes 108 and the second plurality of probes form a staggered pattern (e.g., one of the second plurality of probes is disposed between four adjacent conductive probes 108). The sensor 100 may have another conductive layer that acts as a ground layer. The ground layer may be formed, e.g., below the drive lines 102. The ground layer and the drive lines 102 may be separated by another insulating (e.g., dielectric) layer. Each of the second plurality of conductive probes may extend through the insulating layer 106 and the other insulating layer to electrically connect to the ground layer. Each of the second plurality of conductive probes may extend to be flush with the sensing surface 101, or may terminate at a location below the sensing surface 101. As discussed above, the plurality of second conductive probes may help to focus the signal at the pickup elements 104.

The structures described according to the above embodiments provide advantages such as:
Design
Ergonomics and usability
Simplified integration and enhanced durability
User feedback for increased biometric performance
Direct interaction with application graphics and animation Additional details for forming a structure with a conductive probe, drive plate, and pickup plate, including other embodiments and other arrangements for such structures, are provided in Norwegian Patent Application 20131423, Norwegian Patent Application 20130289, and U.S. patent application Ser. No. 14/183,893 (U.S. Patent Application Publication No. 2014/0241595) the entire contents of which are incorporated herein by reference.

The figures below illustrate example circuits that are configured to provide drive signals to drive lines and to process signals detected at pickup lines.

Figure 12:
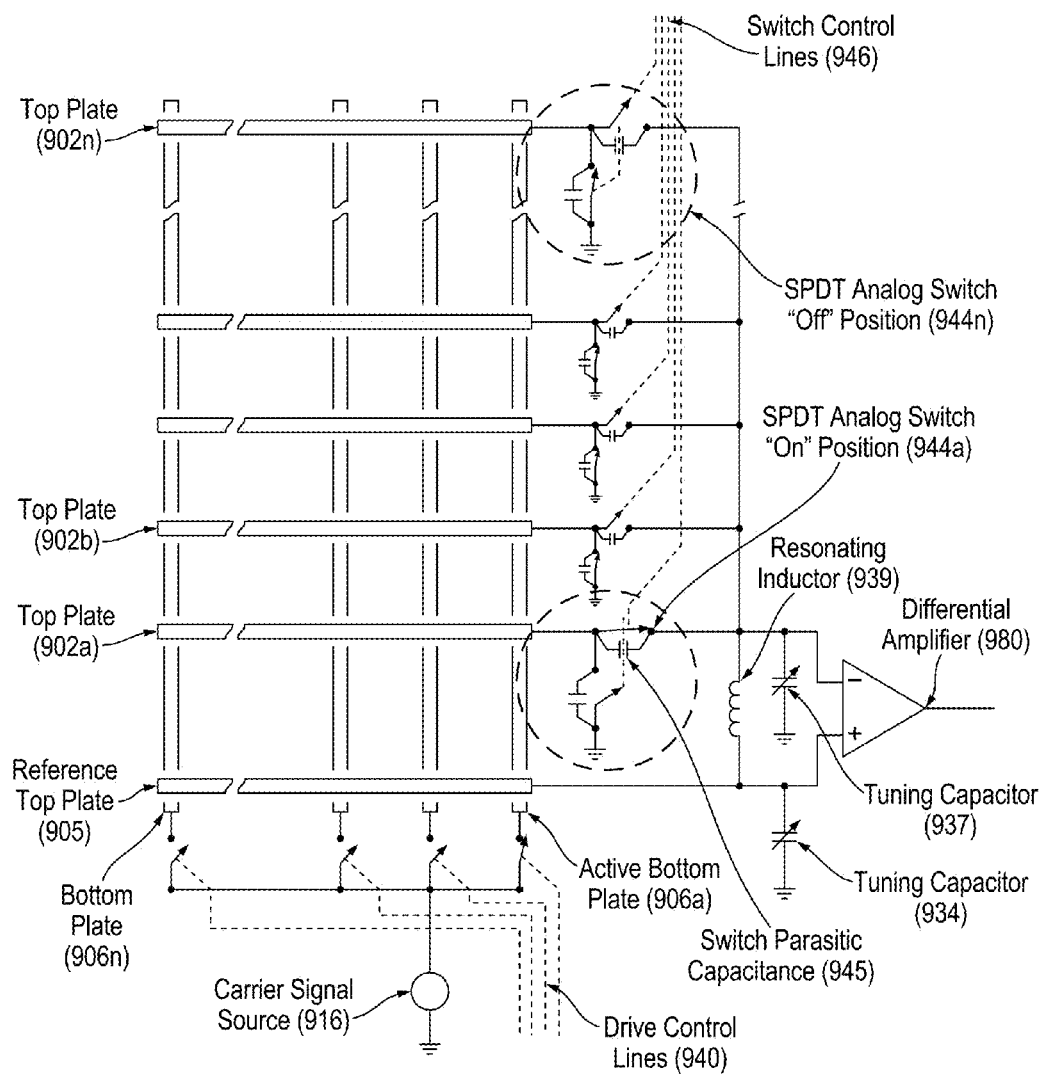
FIG. 12 illustrates an embodiment of drive and sense multiplexing circuitry that uses a tank circuit to compensate for input loading effects.

FIG. 12 shows a circuit diagram of an example of a front end for the placement sensor in a topology that uses a bank of Single Pole Double Throw Switches or SPDTs to scan the pickup plate rows and a bank of Single Pole Single Throw switches to multiplex the pickup plate columns. The sensor of FIG. 12 includes top plates (i.e., pickup plates) 902*a*, 902*b*, . . . 902*n*, bottom plates (i.e., drive plates) 906*a*-906*n* and a reference top plate (i.e., pickup plate) 905. A carrier signal source 916 generates a drive signal for the bottom plates 906*a*-906*n*, which are selectively connectable to the carrier signal source 916 via switches that are controlled by drive control lines 940.

In FIG. 12 we see a snapshot of the analog switches 944*a*-944*n* (controlled by switch control lines 946) as the scanning process begins. Only bottom plate 90 *a* (the active bottom plate) is connected to the carrier signal source 916. Only the first SPDT switch 944*a* is shown in the "on" position, which allows pickup plate 902*a* to conduct its plate signal into Differential Amplifier 980. The remaining pickup plates are shorted to ground via switches 944*n*, preventing any pickup signal received by them from entering into differential amplifier 980.

Each SPDT has a Parasitic Capacitance 945 due to the fact that real world switches do not give perfect isolation. In fact the amount of isolation decreases with frequency, typically modeled by a parallel capacitor across the switch poles. By using a SPDT switch we can shunt this capacitance to ground when an individual plate is not active. Since there is a large array of switches equal to the number of pickup plates, typically 200 for a 500 dpi sensor, the effective shunt capacitance to ground is multiplied by that number. So if a given switch has 0.5 picofarads of parasitic capacitance and there are 200 pickups, that would add up to 100 picofarads of total shunt capacitance.

In order to prevent this large capacitance from diverting most of the received signal from the active pickup to ground, it is desirable in this example to use a compensating circuit. This is accomplished by using resonating inductor 939, forming a classic bandpass filter circuit in conjunction with parasitic capacitors 945 (one per switch) and tuning capacitors 934 and 937. A two-step null & peak tuning calibration procedure is used where tuning capacitor 934 and 937 are individually tuned with inductor 939 using the same drive signal on both the plus and minus inputs to differential amplifier 980. The two bandpass filters formed with inductor 939 and resonating capacitors 934 and 937, respectively will be tuned to the same center frequency when there is zero signal out of differential amplifier 980. Next capacitors 934 and 937 and inductor 939 are tuned together using a differential input signal with opposite 180 degrees phases on the plus and minus inputs to the differential amplifier 980. They are incremented in lock step until the exact drive carrier frequency is reached, this occurs when the output of differential amplifier 980 is at its peak, making the center frequency equal to the exact frequency of the carrier drive signal 916.

In a systems implementation, a calibration routine would be performed before each fingerprint scan to minimize drift of this filter with time and temperature. The resonating inductor 939 needs to have a Q or Quality Factor of at least 10 to give the filter the proper bandwidth characteristics necessary to optimize the signal to noise ratio.

Figure 13:
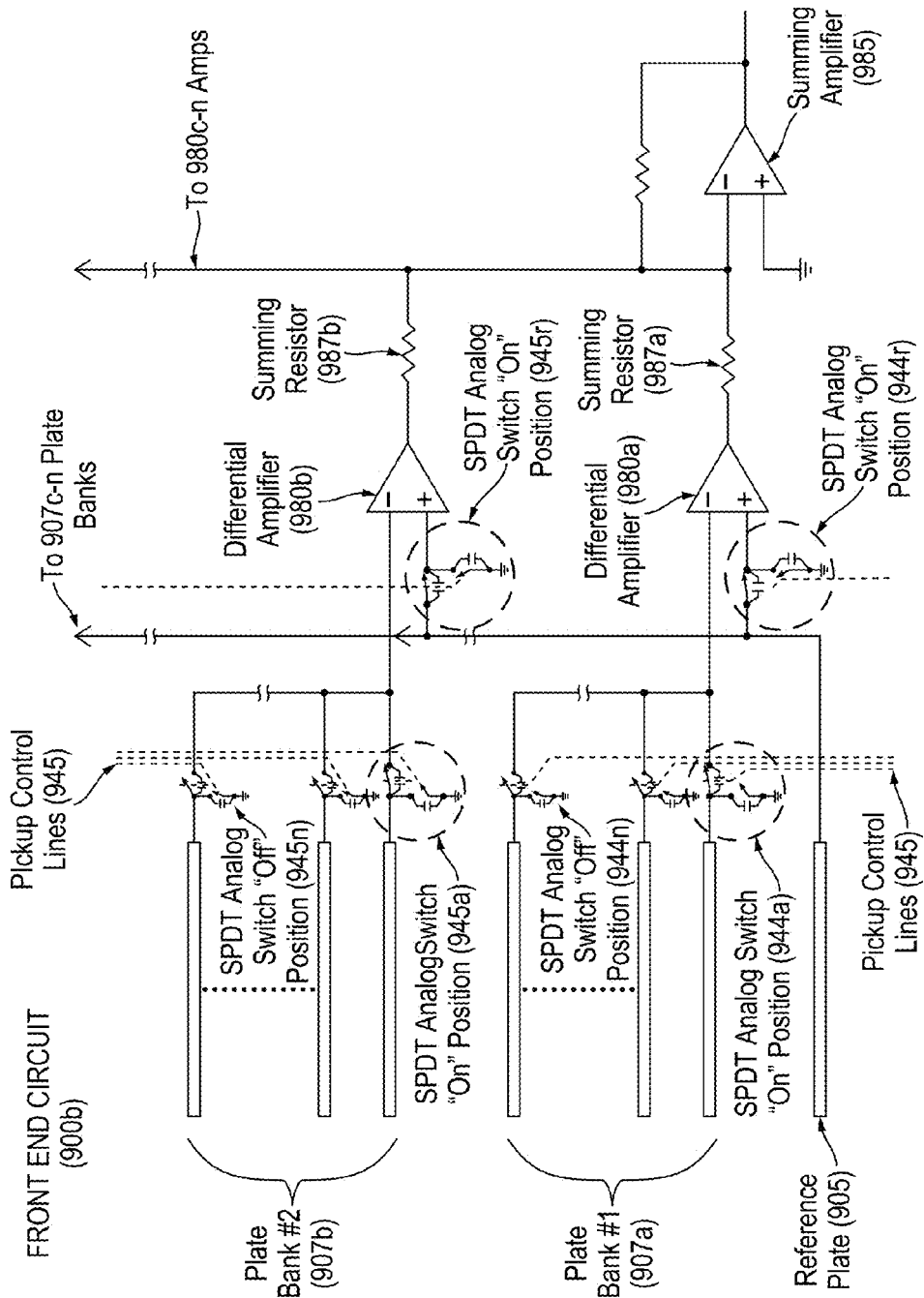
FIG. 13 illustrates an embodiment of drive and sense multiplexing circuitry that uses cascaded buffers for each sense to compensate for loading effects.

FIG. 13 shows an alternate example of a device (front end circuit 900*b*) employing multiple banks 907*a*, 907*b* of plates grouped together, each with their own differential amplifiers 980*a*, 980*b*. The pickup lines of bank #1 907*a* are selectively controlled to the differential amplifier 980*a* by switches 944*a*-944*n* connected by pickup control lines 945, and the pickup lines of bank #2 907*b* are selectively connected to the differential amplifier 980*b* by switches 945*a*-945*n* controlled by pickup control lines 945.

Dividing up the large number of parallel pickup plates into groups each containing a smaller number of plates is an alternate architecture that would not require the use of a tuned bandpass filter in the front end because the parasitic switch capacitances would be greatly reduced. This would have two possible advantages, first lower cost, and second the ability to have a frequency *agile* front end. In this Figure we have a snapshot of the front end where the first switch 944*a* of bank 907*a* is active. All other switch banks 907*b* are shown inactive, shorting their respective plates to ground. Therefore, only voltage or current differential amplifier 980*a* has any plate signal conducted into it, voltage or current differential amplifiers 980*b* have both their positive and negative inputs shorted to ground through their respective switches 945*a*-945*n* and 945*r*, preventing any signal from those banks making a contribution to the overall output.

Each of the differential amplifiers 980*a*, 980*b* are summed through resistors 987*a*, 987*b*, respectively into summing amplifier 985. Only the differential amplifier 980*a* in this snapshot has plate signal routed into it, so it independently produces signal to the input of summing amplifier 985. This process is repeated sequentially until all or substantially all of the switch banks 907*a*, 907*b*, etc. and switch plates 944*a*-944*n*, 945*a*-945*n*, etc, of the entire array are fully scanned.

By splitting the pickup array up, the capacitive input load on each plate is reduced from that of the full array of switches to the number of switches within a given plate group. Dividing, for example, 196 potential pickup plates into 14 banks of 14 plates results in a capacitance load equal to the parasitic capacitance of 14 switches (944), plus the capacitive load of the differential amplifier. If analog switches 944 are constructed with very low parasitic capacitance then the overall input load would be small enough not to need a bandpass circuit in the front end in order to resonate out the load capacitance. As integrated circuit fabrication techniques improve we would be able design smaller switches with less parasitic capacitance, making this approach become more attractive.

Figure 14:
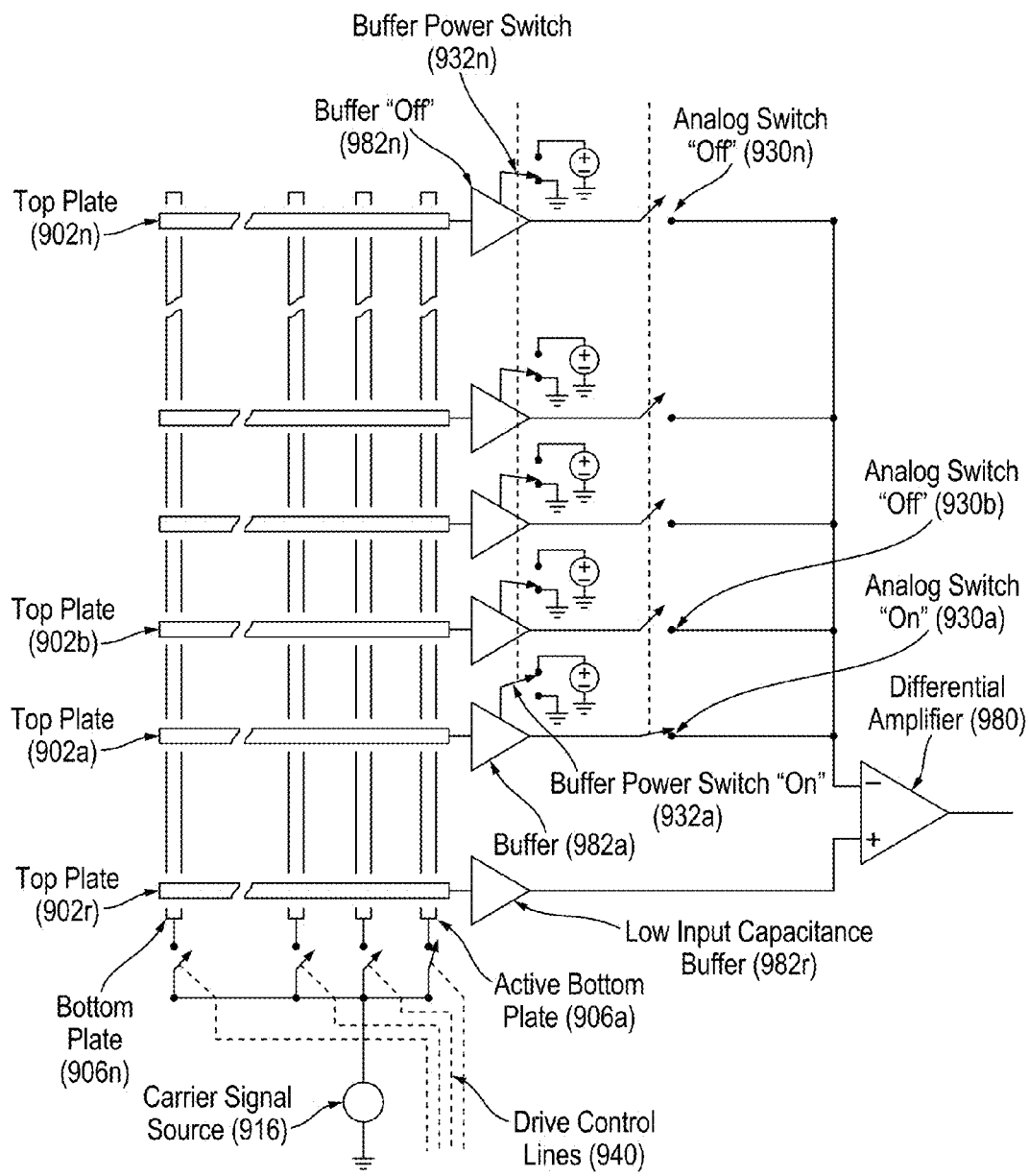
FIG. 14 illustrates an embodiment of drive and sense multiplexing circuitry that that uses dedicated buffers for each sense to compensate for loading effects.

FIG. 14 illustrates another example of a front end circuit using individual plate buffers that are multiplexed into a second stage differential amplifier.

Buffers 982*a* through 982*n* as illustrated are special buffers that are designed to have very low input capacitance. In one embodiment, these buffers could be configured as single stage cascaded amplifiers in order to minimize drain-to-gate Miller capacitance and die area. To better maximize plate to plate isolation, two sets of switches could be used for each input. Analog switches 930*a*-930*n* are included in this example to multiplex each selected buffer into differential amplifier 980. Buffer power switches 932*a*-932*n* are included to shut down the power simultaneously to all the other input buffers that are not selected. This effectively puts them at ground potential. An alternate embodiment would be to put input analog switches in front of each amplifier to allow a short of the unused plates directly to ground. One effect of this approach may be an increase in input load capacitance for each plate.

FIG. 14 shows a snapshot of the scanning process where bottom plate 906*a* is active and top plate 902*a* is being sensed though buffer 982*a* which has power supplied to it through switch 932*a*. Analog switch 930*a* is closed, routing it to differential amplifier 980. All other buffer outputs are disconnected from the differential amplifier 980 via analog switches 930*b-n* and power switches 982*b-n*

The positive input to differential amplifier 980 is always connected to the reference plate 902*r*, through low input capacitance buffer 982*r*, providing an "air" signal reference to the amp. The differential amplifier 980 serves to subtract out noise and common mode carrier signal in addition to providing a "air" reference carrier value.

Figure 15:
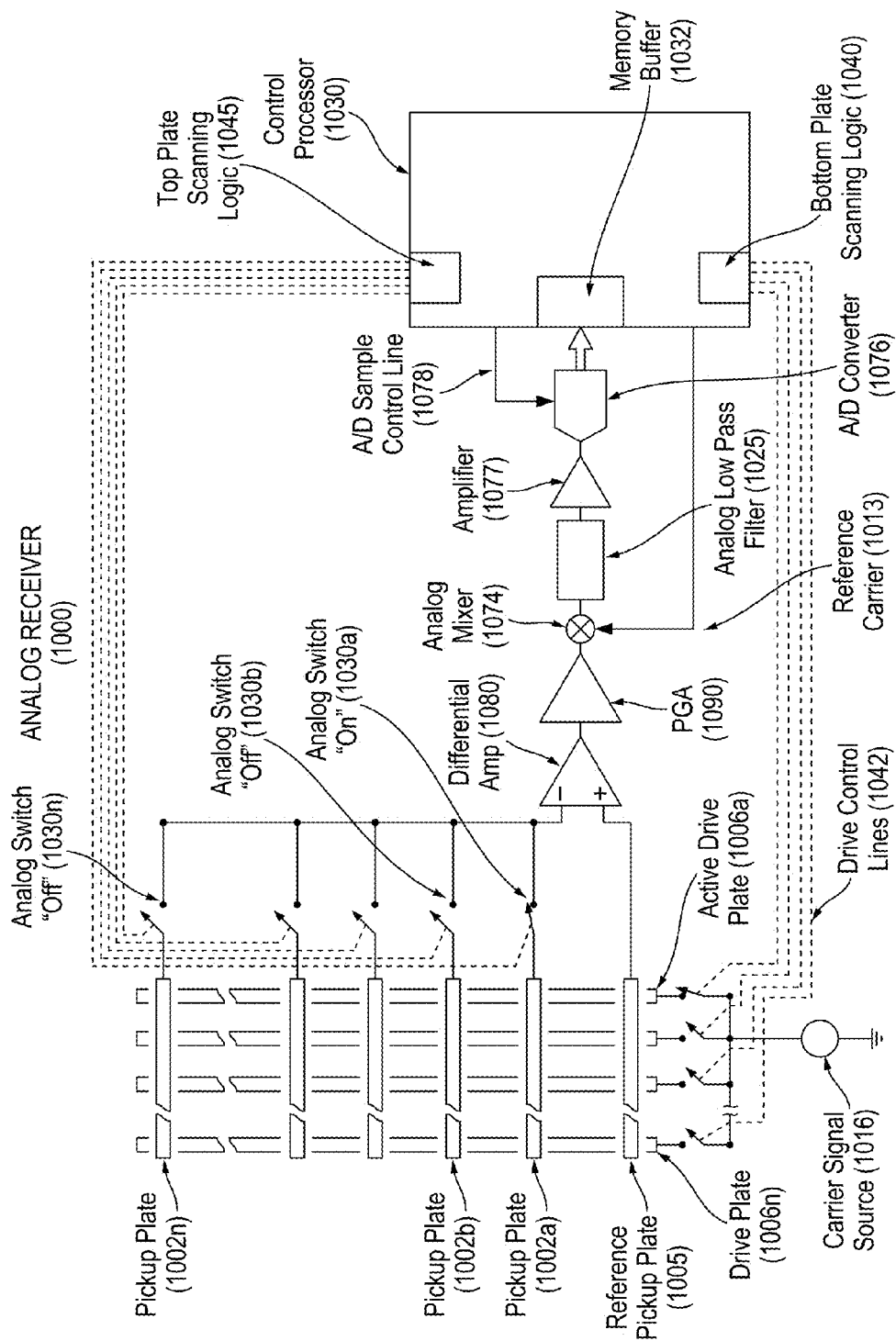
FIG. 15 illustrates an analog receiver to process a sensed signal and processing circuitry to perform drive and pickup line scanning.

FIG. 15 shows a particular embodiment of a placement sensor 1000 implemented with traditional analog receiver technology. The analog front end begins with Differential Amplifier 1080 where selected Pickup Plate 1002*a-n* is subtracted from Reference Plate 1005, which is located outside the finger contact area providing a reference signal equivalent to an ideal fingertip valley. A programmable gain stage or PGA 1090 follows the Differential Amplifier 1080, but could be integrated into the same block providing both gain an subtraction in a single stage. PGA 1090 is designed to have a gain range wide enough to compensate for production variations in plate etching and solder mask thickness between the layers.

Control processor 1030 orchestrates the scanning of the two dimensional sensor plate array. Drive plates/columns 1006*a*-1006*n* are activated sequentially by the Bottom Plate Scanning Logic 1040 in the Control Processor 1030 via drive control lines 1042. When a selected drive plate is activated it is connected to carrier signal source 1016. All inactive drive plates are connected to ground. Before activating the next drive plate in the sequence the active drive plate remains on long enough for the entire row of Pickup Plates 1002*a-n* to be scanned by Top Plate Scanning Logic 1045 in the Control Processor 1030, which sequentially closes and then opens analog switches 1030*a*, 1030*b*, . . . 1030*n*.

Analog mixer 1074 multiplies the gained up plate signal against the reference carrier 1013. The result is a classic spectrum of base band plus harmonic products at multiples of the carrier frequency. An analog low pass filter 1025 is employed to filter out the unwanted harmonics and must have a sharp enough roll to attenuate the information associated with of the second harmonic without losing base band information.

Following the low pass filter 1025 is an amplifier 1077 and then an A/D Converter 1074 that must sample at a least twice the pixel rate to satisfy the Nyquist criteria. Memory buffer 1032 within control processor 1030 stores the A/D samples locally with sufficient size to keep up with the worst case latency of the host controller. The A/D Sample Control Line 1078 provides a sample clock for the converter to acquire the sequential pixel information that is created by the sequencing of the plate rows and columns.

Figure 16:
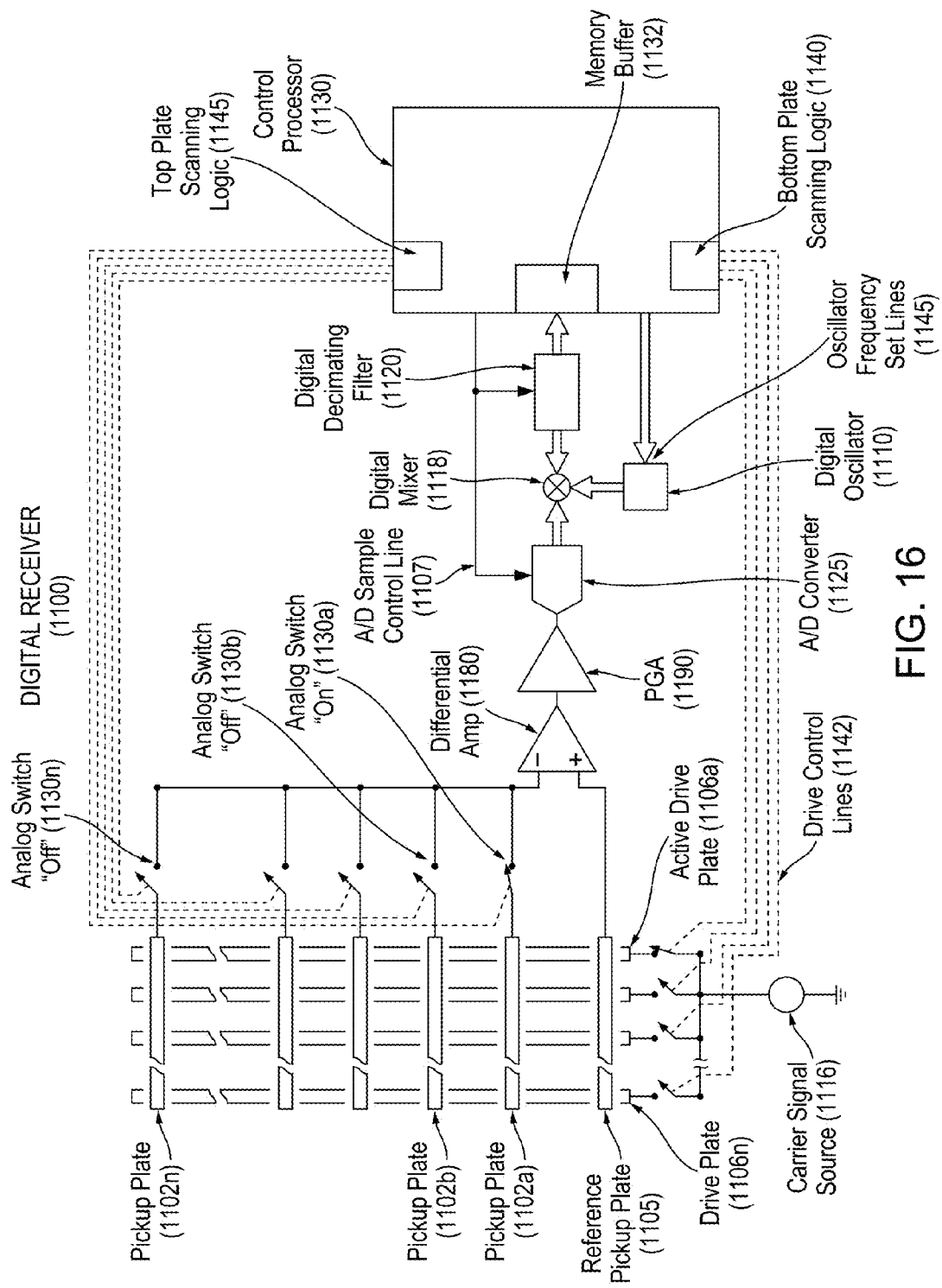
FIG. 16 illustrates a direct digital conversion receiver to process a sensed signal and processing circuitry to perform drive and sense line scanning.

FIG. 16 shows an example of one embodiment of a placement sensor 1100 implemented with direct digital conversion receiver technology. In this example, the analog front end begins with Differential Amplifier 1180 where selected Pickup Plate 1102*a-n* is subtracted from Reference Plate 1105, which is located outside the finger contact area providing a reference signal equivalent to an ideal finger valley. The electrical subtraction of these signals performs several functions: first wide band common mode is subtracted out; second, subtracting against reference plate 1105 provides a relative reference signal equivalent to an ideal ridge valley; third, common mode carrier signal that couples into both plates other than through a finger is also subtracted out. Elimination of common mode is particularly important in high RF noise environments. First order carrier cancellation of etch variation in the pickup plates also occurs when we subtract out carrier that is coupled in by other means than through fingers placed on the sensor. This is critical for high volume manufacturing at a low cost.

A programmable gain stage or PGA 1190 follows the Differential Amplifier 1180, which could easily be combined into a single differential amplifier including programmable gain as is commonly done in modern integrated circuit design. PGA 1190 is designed to have a gain range wide enough to compensate for production variations in plate etching and solder mask thickness between the layers.

Control processor 1130 orchestrates the scanning of the two dimensional sensor plate array. Drive plates/columns 1106*a*-1106*n* are activated sequentially by the Bottom Plate Scanning Logic 1140 in the Control Processor 1130 via drive control lines 1142. When a selected drive plate is activated it is connected to carrier signal source 1116. All inactive drive plates are connected to ground. Before activating the next drive plate in the sequence the active drive plate remains on long enough for the entire row of Pickup Plates 1102*a-n* to be scanned by Top Plate Scanning Logic 1145 sequentially connecting the pickup plates 1102*a-n* to the differential amplifier 1180 via analog switches 1130*a*, 1130*b*, etc. and captured by the A/D converter 1125.

The A/D Converter 1125 is sampled at a rate of at least twice the carrier frequency to satisfy the Nyquist criteria. The A/D Sample Control Line 1107 provides a sample clock for the converter to acquire the sequential pixel information that is created by the sequencing of the plate rows and columns.

Following the A/D converter is a Digital Mixer 1118 that digitally multiplies the A/D output which is at the carrier frequency against the reference carrier generated by the Digitally Controlled Oscillator 1110 (coupled to the control processor 1130 via the oscillator frequency set lines 1145). The result is that the signal is down converted to the base band with the carrier removed. There are other unwanted spectral components created by this process, namely a double time carrier side band, but these can easily be filtered out.

A combination decimator and digital filter 1120 follows the Digital Mixer 1118. This block performs sampling down conversion, reducing the sample rate from at least twice the carrier frequency to at least twice the pixel rate which is much lower. The digital filter would typically include a Cascaded Integrator Comb, or CIC filter, which removes the unwanted spectral byproducts of mixing as well as improving the receiver signal to noise. A CIC filter provides a highly efficient way to create a narrow bandpass filter after mixing the signal down to baseband with the digital mixer. The CIC filter may be followed by a FIR filter running at the slower decimated rate to correct bandpass droop.

With a reduction of sample rate in the order of 100:1 a relatively small Control Processor Buffer (1132) could be used to capture an entire fingerprint. For example a 200×200 array producing 40 k pixels could be stored in a 40 kb buffer. This is in contrast to a swipe sensor which must scan the partial image frames at a rate fast enough to keep up with the fastest allowable swipe speed, usually around 200 ms. At the same time, a slow swipe of two seconds must also be accommodated, requiring ten times the amount of memory as the fastest one. Various techniques have been developed to throw away redundant sample lines before storage, but even with that the real time storage requirements are much greater for swipe sensors. This is a critical factor in Match on Chip applications where memory capacity is limited. In addition, a placement sensor has no real-time data acquisition or processing requirements on the host processor beyond the patience of the user for holding their finger in place.

Figure 17:
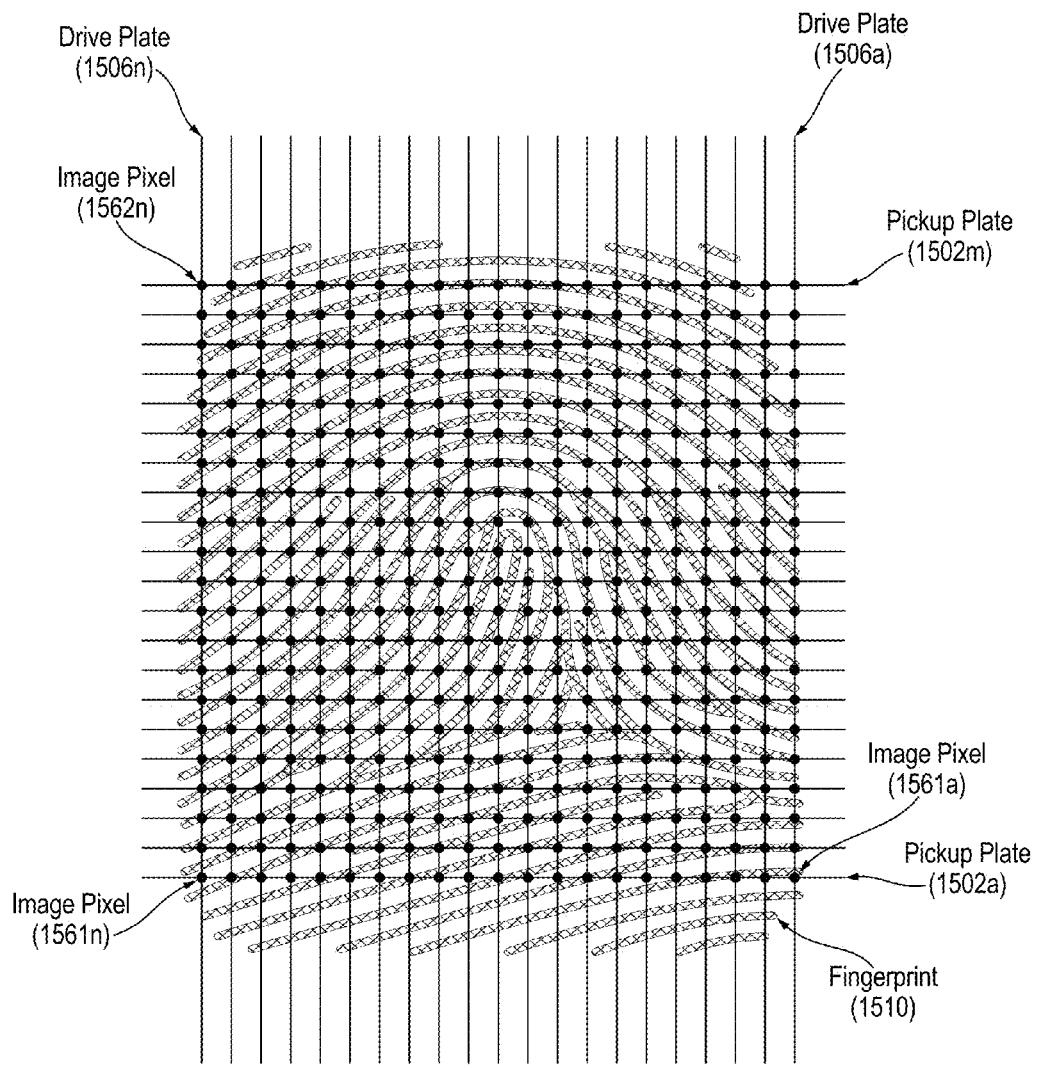
FIG. 17 illustrates a diagrammatic view of sensing of fingerprint features.

FIG. 17 Illustrates how a device configured according to this disclosure may be applied to a fingerprint sensing application. A user places a finger with fingerprint (1510) over the sensor grid, which is formed by the crossover locations of the drive plates (1506a-1506n) and the pickup plates (1502a-1502m). Image pixel 1561a senses the fingerprint area above the electrode pair of drive plate 1506a and pickup plate 1502a, pixel 1561n senses the crossover of drive 1506n and pickup 1502a, and pixel 1562n senses the area above the crossover of drive 1506n and pickup 1502m

Figure 18:
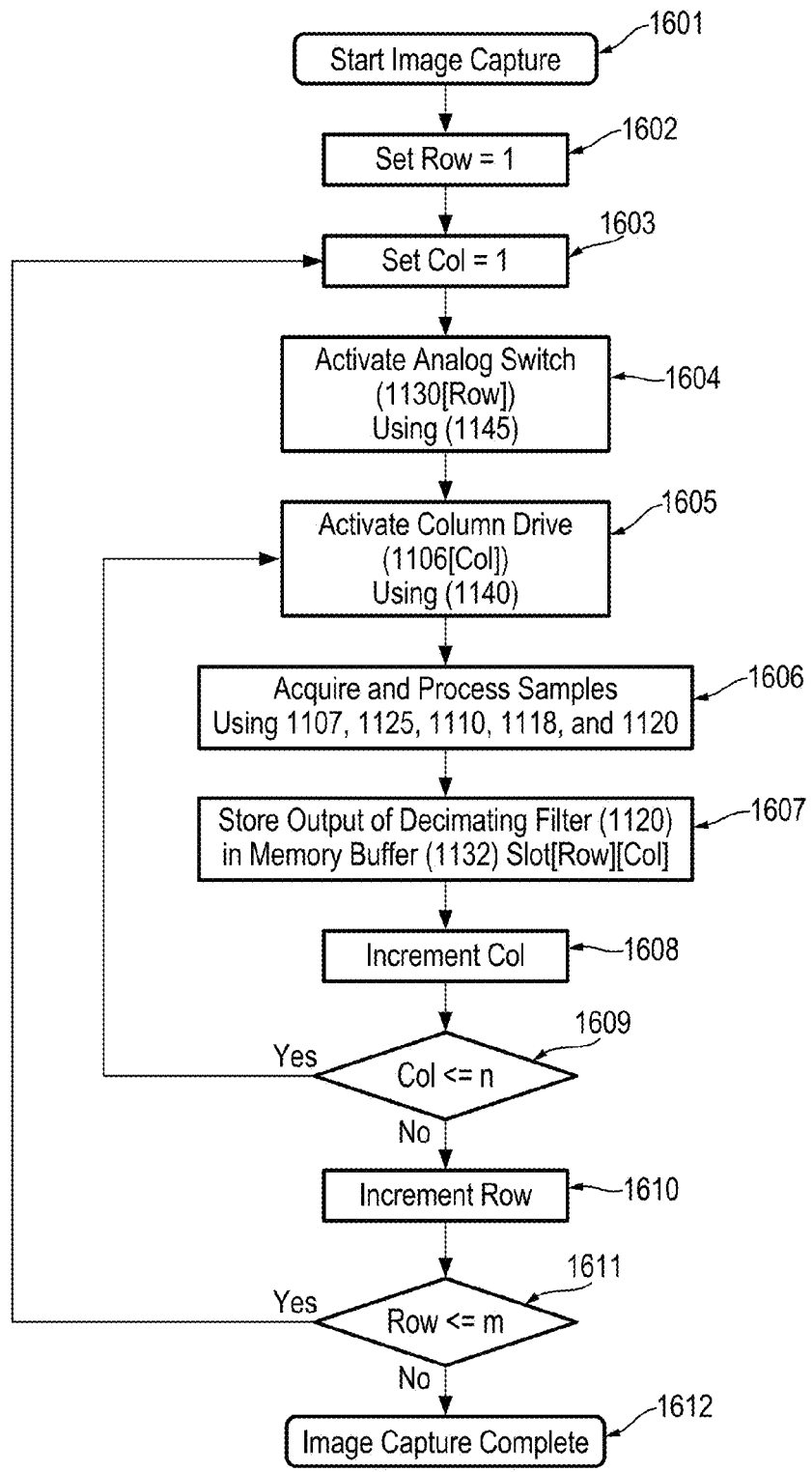
FIG. 18 illustrates steps for collecting a 2-D image with a sensor system.

FIG. 18 illustrates the steps required to collect the fingerprint image as shown in FIG. 17, using the embodiment shown in FIGS. 12-16. Image capture begins at step 1601. As part of the initialization, a row counter is initialized to 1 at step 1602. Step 1603 is the beginning of a row scan sequence. At the beginning of each row, a column counter is set to 1 at step 1603. In step 1604, the top plate scanning logic 1145 activates the appropriate analog switch (one of 1130a through 1130n) for the selected row. In Step 1605 the sense of an individual pixel begins when the bottom plate scanning logic 1140 activates the appropriate drive plate (one of 1106a through 1106n) with the carrier signal 1116. At step 1606 the signal from differential amplifier 1180 is sampled repeatedly by A/D converter 1125 after processing through programmable gain amplifier 1190. Digital mixer 1118 mixes the samples down to the baseband frequency set by digital oscillator 1110. The baseband signal is then filtered by digital decimating filter 1120 to produce a signal level value for the current pixel. The functions performed for this step in the embodiment of FIG. 16 could alternatively be performed by the corresponding analog receiver shown in FIG. 15, or other functionally similar arrangements. In step 1607 the signal level value derived in step 1606 is stored in the appropriate position in memory buffer 1132 which corresponds to the currently selected row and column. In step 1608 the column number is incremented, and in step 1609 the column number is tested to determine whether the current row collection has been completed. If the row has not been completed, we return to step 1605 to collect the next pixel in the row. If the row is complete, we proceed to step 1610 and increment the row number. In step 1611, we test the row number to determine if all the rows have been scanned. If not, flow returns to 1603 to start the next row back at the first column. Once all the rows have been scanned, image capture is complete, and we proceed to step 1612, at which point the image is ready for further processing or transfer to long term storage.

Those skilled in the art will recognize that row and column scanning order may not correspond directly to physical position in the array, as some implementations may more optimally be sampled in interleaved fashions.

Figure 19:
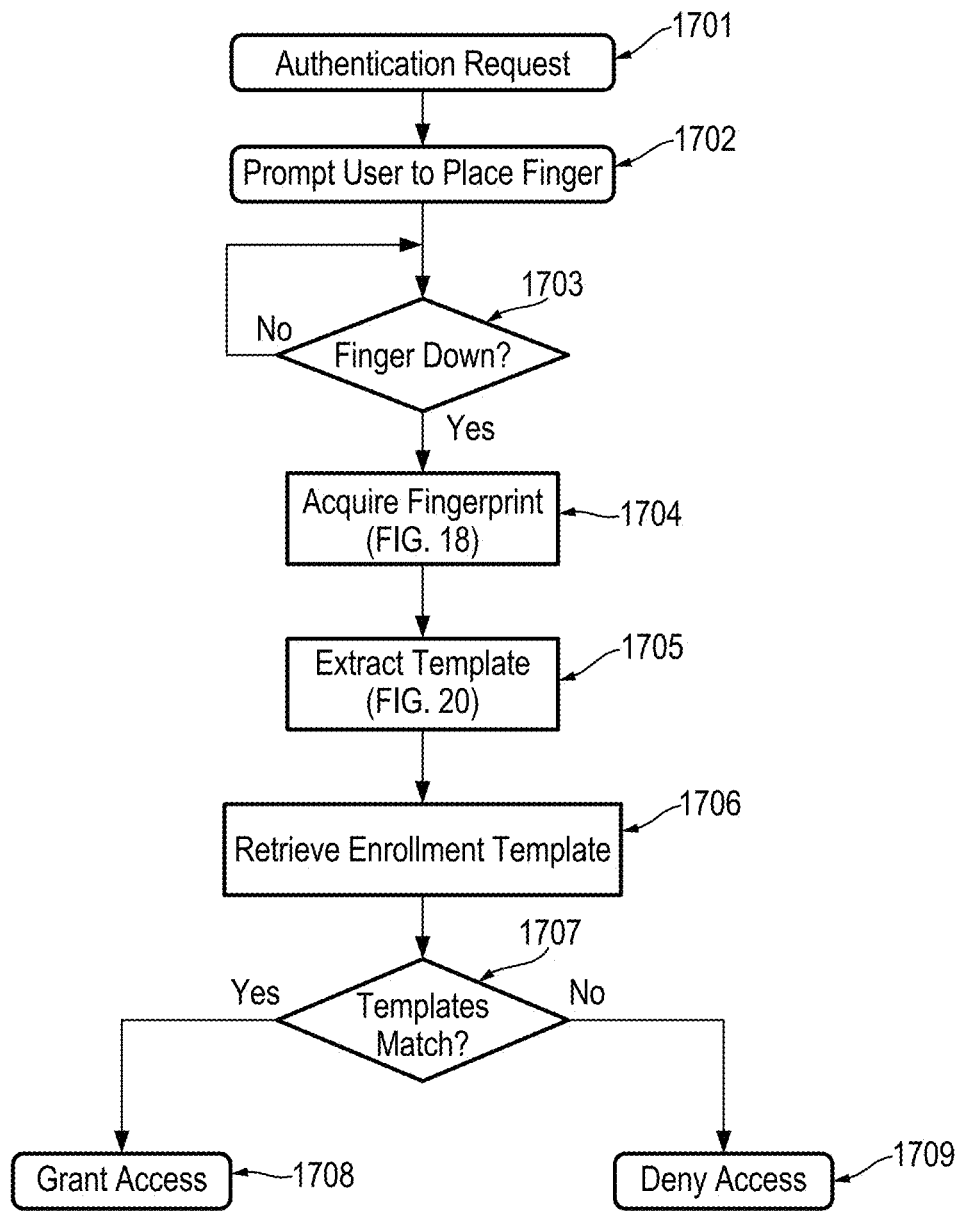
FIG. 19 illustrates steps for authenticating a user with a fingerprint sensor.
Figure 20:
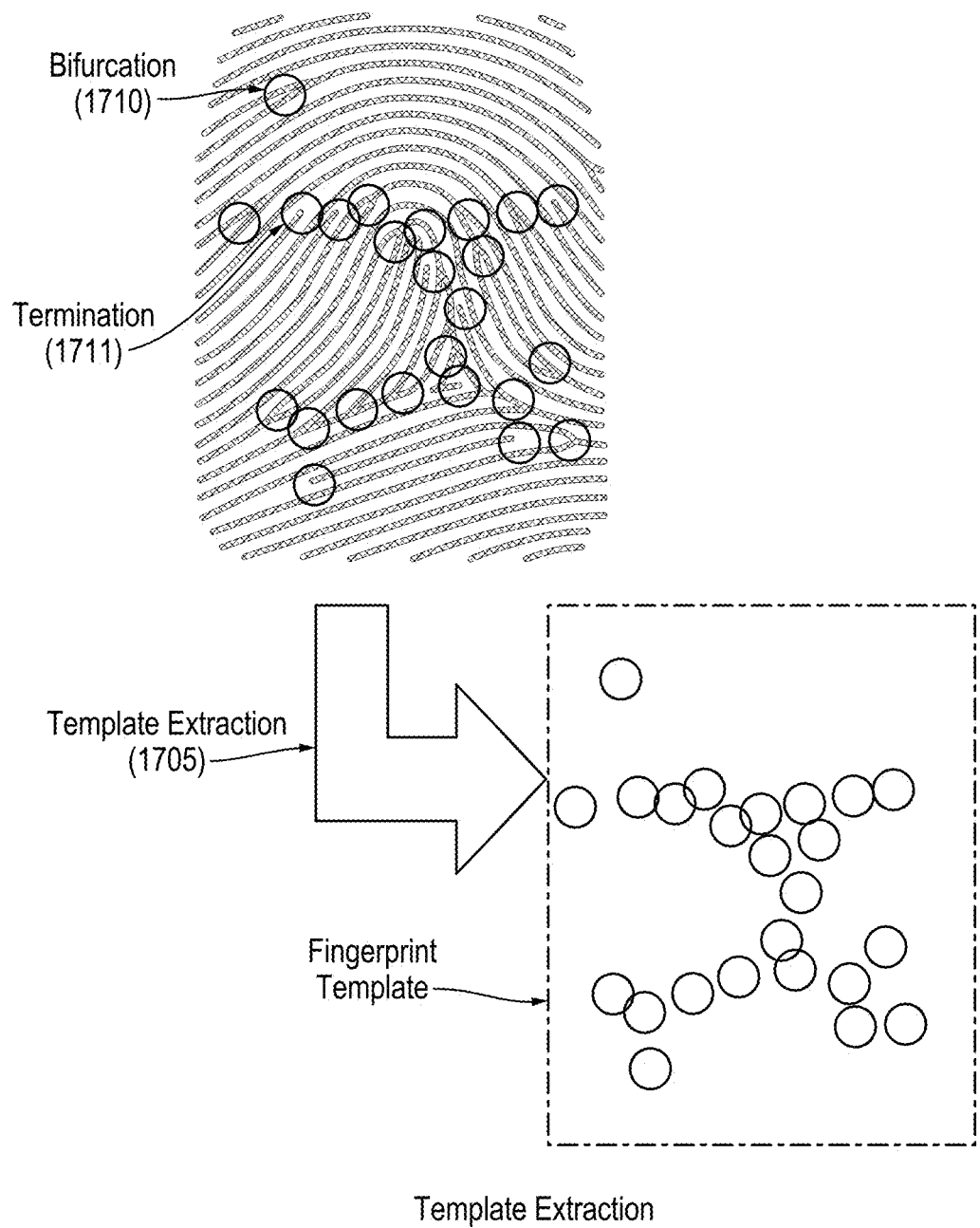
FIG. 20 illustrates template extraction from a fingerprint image typically used in user authentication applications.

In FIGS. 19 and 20, an example is shown for a user authentication application. In step 1701 a system level application on a processor requires user authentication. At step 1702 the user is prompted to provide a finger for verification. The system waits for finger presence to be detected in step 1703. This can be performed by collecting a reduced size image as described in FIGS. 18 and 20 and testing for finger image, or via other dedicated hardware. Once finger presence is detected, a complete image is collected in step 1704, using the method described in FIG. 18 or other substantially similar method. This image is then stored and in step 1705 converted into a template, typically consisting of a map of minutia point locations and types (such as bifurcations 1710, and terminations 1711), or possibly of ridge frequency and orientation, or some combination of both. In step 1707 the template is then compared against one or more enrollment templates that were retrieved from persistent template storage in step 1706. If a match is found, the user is authenticated in step 1708 and granted access to the application. If no match is found, the user is rejected in step 1709, and access is denied.

While certain exemplary embodiments have been described and shown in the accompanying drawings, it is to be understood that such embodiments are merely illustrative of and not restrictive on the disclosure, and that the invention disclosed herein is not limited to the specific constructions and arrangements shown and described, since various other modifications may occur to those ordinarily skilled in the art. Accordingly, the specification and drawings are to be regarded in an illustrative rather than a restrictive sense, and alternative arrangements and/or quantities of, connections of various sorts, arrangements and quantities of transistors to form circuits, and other features and functions can occur without departing from the spirit and scope of the disclosure. Similarly, components not explicitly mentioned in this specification can be included in various embodiments of this disclosure without departing from the spirit and scope of the disclosure. Also, different process steps and integrated circuit manufacture operations described as being performed to make certain components in various embodiments of this disclosure can, as would be apparent to one skilled in the art, be readily performed in whole or in part to make different components or in different configurations of components not explicitly mentioned in this specification without departing from the spirit and scope of the disclosure. Accordingly, the specification and drawings are to be regarded in an illustrative rather than a restrictive sense.

Again, the invention has application in many areas, particularly in biometric sensors. Fingerprint sensors, for example, and other biometric sensors are gaining increasing acceptance for use in a wide variety of applications for security and convenience reasons. Devices, systems and methods configured according to the invention will have improved security of the biometric verification process without increasing the cost of the system. Furthermore, the invention may extend to devices, systems and methods that would benefit from validation of components. As discussed above, the invention includes the ability for the host and sensor to include any combination or subset of the above components, which may be arranged and configured in the manner most appropriate for the system's intended application. Those skilled in the art will understand that different combinations and permutations of the components described herein are possible within the spirit and scope of the invention, which is defined by the appended Claims, their equivalents, and also Claims presented in related applications in the future and their equivalents.

The invention may also involve a number of functions to be performed by a computer processor, such as a microprocessor. The microprocessor may be a specialized or dedicated microprocessor that is configured to perform particular tasks according to the invention, by executing machine-readable software code that defines the particular tasks embodied by the invention. The microprocessor may also be configured to operate and communicate with other devices such as direct memory access modules, memory storage devices, Internet related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

Within the different types of devices, such as laptop or desktop computers, hand held devices with processors or processing logic, and also possibly computer servers or other devices that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by the central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured according to the invention as described herein enable the physical transformation of these memory devices. Accordingly, the invention as described herein is directed to novel and useful systems and methods that, in one or more embodiments, are able to transform the memory device into a different state. The invention is not limited to any particular type of memory device, or any commonly used protocol for storing and retrieving information to and from these memory devices, respectively.

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present invention. The machine-readable medium includes any mechanism that provides (i.e., stores and/or transmits) information in a form readable by a machine (e.g., a computer, PDA, cellular telephone, etc.). For example, a machine-readable medium includes memory (such as described above); magnetic disk storage media; optical storage media; flash memory devices; biological electrical, mechanical systems; electrical, optical, acoustical or other form of propagated signals (e.g., carrier waves, infrared signals, digital signals, etc.). The device or machine-readable medium may include a micro-electromechanical system (MEMS), nanotechnology devices, organic, holographic, solid-state memory device and/or a rotating magnetic or optical disk. The device or machine-readable medium may be distributed when partitions of instructions have been separated into different machines, such as across an interconnection of computers or as different virtual machines.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Accordingly, the specification and drawings are to be regarded in an illustrative rather than a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or Claim refers to "a" or "an" element, that does not mean there is only one of the element. If the specification or Claims refer to "an additional" element, that does not preclude there being more than one of the additional element.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the invention and are not intended to be limiting.

The methods, systems and devices include improved security operations and configurations with a novel approach to biometric systems. Such systems would greatly benefit from increased security features, particularly in financial transactions. Although this embodiment is described and illustrated in the context of devices, systems and related methods of validating biometric devices such as fingerprint sensors, the scope of the invention extends to other applications where such functions are useful. Furthermore, while the foregoing description has been with reference to particular embodiments of the invention, it will be appreciated that these are only illustrative of the invention and that changes may be made to those embodiments without departing from the principles of the invention, the scope of which is defined by the appended Claims and their equivalents.

The invention claimed is:

1. A fingerprint sensor, comprising:
a first conductor formed as a drive line;
a second conductor formed as a pickup line, wherein the drive line is oriented substantially transversely to the pickup line;
a dielectric layer separating the drive line and the pickup line, wherein a crossover location at which the pickup line overlaps the drive line defines an impedance sensitive electrode pair;
a detecting circuit configured to detect a signal at the impedance sensitive electrode pair;
an overlay layer formed of an insulating material and located over a crossover location at which the pickup line overlaps the drive line; and
a conductive probe embedded within the overlay layer and having a first end and a second end, wherein the first end is in proximity to the crossover location and the second end is in proximity to a top surface of the overlay layer to extend a sensing surface of the fingerprint sensor from a top surface of the pickup line to the top surface of the overlay layer.

2. The fingerprint sensor of claim 1, wherein the conductive probe is configured and oriented so that the thickness of the conductive probe partially overlaps the pickup line at the crossover location.

3. The fingerprint sensor of claim 2, wherein the conductive probe is configured and oriented so that half thickness of the conductive probe overlaps the pickup line at the crossover location and half the thickness of the conductive probe overlaps insulating material adjacent the pickup line.

4. The fingerprint sensor of claim 1, wherein the first end of the conductive probes is in contact with the pickup line at the crossover location.

5. The fingerprint sensor of claim 1, wherein the first end of the conductive probe is separated from the pickup line at the crossover location by a dielectric region.

6. The fingerprint sensor of claim 4, wherein the second end of the conductive probe is coplanar with the top surface of the overlay layer.

7. The fingerprint sensor of claim 1 further comprising a second conductive probe that is electrically connected to a ground potential.

8. The fingerprint sensor of claim 7, further comprising a ground layer between the overlay layer and the drive line and the pickup line, wherein the second conductive probe is electrically connected to the ground layer.

9. The fingerprint sensor of claim 1, wherein the fingerprint sensor structure is part of a touch screen of a touch-enabled device.

10. The fingerprint sensor of claim 1, wherein the overlay layer is formed from a material selected from the group consisting of: glass, poly methyl methacrylate, polycarbonate, polycarbonate, and a flexible polymer substrate.

11. The fingerprint sensor of claim 1, wherein the conductive probes is formed from a material selected from the group consisting of: copper, indium tin oxide, a conductive paste made of carbon nanotubes, graphite powder, or copper, a conductive adhesive comprising silver, copper, or graphite, and a conductive polymer.

12. The fingerprint sensor of claim 1, further comprising an activation circuit configured to supply a signal to the drive line.

13. The fingerprint sensor of claim 12, further comprising a switch associated with the drive line configured to selectively connect the drive line to the activation circuit.

14. The fingerprint sensor of claim 1, further comprising a switch associated with the pickup line configured to selectively connect the pickup line to the detecting circuit.

15. The fingerprint sensor of claim 1, further comprising an insulating layer above the conductive probe on the top surface of the overlay layer.

16. A fingerprint sensor, comprising:
a first conductive layer formed as a plurality of parallel drive lines;
a second conductive layer formed as a plurality of parallel pickup lines, wherein the plurality of parallel drive lines are oriented transversely to the plurality of parallel pickup lines;
a dielectric layer separating the first conductive layer and the second conductive layer, wherein each crossover location at which one of the pickup lines overlaps one of the drive lines defines an impedance sensitive electrode pair;
a detecting circuit configured to detect a signal at each impedance sensitive electrode pair;

an overlay layer formed of an insulating material and located over the first conductive layer and the second conductive layer; and a plurality of conductive probes embedded within the overlay layer, wherein each of the plurality of conductive probes has a first end and a second end, wherein the first end of each conductive probe is in proximity to an associated one of the crossover locations, and wherein the second end of each of the conductive probes is in proximity to an outer surface of the overlay layer to extend a sensing surface of the fingerprint sensor from a top surfaces of the pickup lines to the outer surface of the overlay layer.

17. The fingerprint sensor of claim 16, wherein each conductive probe is configured and oriented so that the thickness of the conductive probe partially overlaps the pickup line at the crossover location.

18. The fingerprint sensor of claim 17, wherein each conductive probe is configured and oriented so that half thickness of the conductive probe overlaps the pickup line at the crossover location and half the thickness of the conductive probe overlaps insulating material adjacent the pickup line.

19. The fingerprint sensor of claim 16, wherein the first end of each of the conductive probes is in contact with one of the plurality of pickup lines at the associated crossover location.

20. The fingerprint sensor of claim 16, wherein the first ends of the conductive probes are separated from the pickup lines by a dielectric region.

21. The fingerprint sensor of claim 16, wherein the second end of each of the conductive probes is coplanar with the top surface of the overlay layer.

22. The fingerprint sensor of claim 16, further comprising a second plurality of conductive probes that are each electrically connected to a ground potential.

23. The fingerprint sensor of claim 22, further comprising a ground layer between the overlay layer and at least one of the drive line and the pickup line, wherein the second plurality of conductive probes are each electrically connected to the ground layer.

24. The fingerprint sensor of claim 16, wherein the fingerprint sensor structure is part of a touch screen of a touch-enabled device.

25. The fingerprint sensor of claim 16, wherein the overlay layer is formed from a material selected from the group consisting of: glass, poly methyl methacrylate, polycarbonate, polycarbonate, and a flexible polymer substrate.

26. The fingerprint sensor of claim 16, wherein each of the conductive probes is formed from a material selected from the group consisting of: copper, indium tin oxide, a conductive paste made of carbon nanotubes, graphite powder, or copper, a conductive adhesive comprising silver, copper, or graphite, and a conductive polymer.

27. The fingerprint sensor of claim 16, further comprising an activation circuit configured to supply a signal to each drive line.

28. The fingerprint sensor of claim 27, further comprising a switch associated with each drive line configured to selectively connect the associated drive line to the activation circuit.

29. The fingerprint sensor of claim 16, further comprising a switch associated with each pickup line configured to selectively connect the associated pickup line to the detecting circuit.

30. The fingerprint sensor of claim 16, further comprising a plurality of electrodes extending across the outer surface of the overlay layer and configured to couple the second ends of two or more conductive probes.

31. The fingerprint sensor of claim 30, wherein each electrode is connected to two or more conductive probes to galvanically couple the conductive probes connected to the electrode, or the electrode is electrically insulated from two or more conductive probes and is configured to capacitively couple the two or more conductive probes.

32. The fingerprint sensor of claim 16, further comprising an insulating layer above the conductive probes on the top surface of the overlay layer.

* * * * *